US012559213B2

(12) United States Patent
Manning et al.

(10) Patent No.: US 12,559,213 B2
(45) Date of Patent: Feb. 24, 2026

(54) UNCREWED OFFSHORE NODE DEPLOYMENT SYSTEMS AND METHODS

(71) Applicant: BP Exploration Operating Company Limited, Middlesex (GB)

(72) Inventors: Ted Manning, Sunbury-on-Thames (GB); Johnathan Stone, Sunbury-on-Thames (GB)

(73) Assignee: BP Exploration Operating Company Limited (GB)

( * ) Notice: Subject to any disclaimer, the term of this patent is extended or adjusted under 35 U.S.C. 154(b) by 697 days.

(21) Appl. No.: 17/871,148

(22) Filed: Jul. 22, 2022

(65) Prior Publication Data

US 2023/0026535 A1      Jan. 26, 2023

Related U.S. Application Data

(60) Provisional application No. 63/224,595, filed on Jul. 22, 2021.

(51) Int. Cl.
B63G 8/00 (2006.01)
G01V 1/38 (2006.01)
(52) U.S. Cl.
CPC ........... B63G 8/001 (2013.01); G01V 1/3852 (2013.01); B63G 2008/007 (2013.01)
(58) Field of Classification Search
CPC .............. B63G 8/001; B63G 2008/007; G01V 1/3852; B63B 27/16; B63B 2027/165; B63B 2035/006
See application file for complete search history.

(56) References Cited

U.S. PATENT DOCUMENTS

| | | | | |
|---|---|---|---|---|
| 9,459,366 | B2 * | 10/2016 | Henman | .............. G01V 1/3843 |
| 9,784,873 | B2 * | 10/2017 | Rokkan | .................. B65G 67/60 |
| 2017/0285200 | A1 | 10/2017 | Fyffe et al. | |
| 2018/0105239 | A1 | 4/2018 | Lelaurin et al. | |
| 2019/0265378 | A1 | 8/2019 | Meech et al. | |
| 2019/0317235 | A1 | 10/2019 | Lyssy | |
| 2021/0088687 | A1 | 3/2021 | Mancini et al. | |
| 2022/0196868 | A1 * | 6/2022 | Mann | .................. G01V 1/3852 |

OTHER PUBLICATIONS

Smythe, J. et al: "Th MA 05—Advances in OBN Technology: New Designs for Reservoir Monitoring and Large Scale Surveys", Marine Acquisition Workshop, Aug. 22-24, 2018.
International Search Report and Written Opinion dated Oct. 14, 2022, for Application No. PCT/GB2022/051935.
IPOS Search Report and Written Opinion dated Sep. 19, 2025 for Application No. SG 11202400195U.
AE Office Action dated Aug. 17, 2025 for Application No. P6000124/2024.

* cited by examiner

*Primary Examiner* — Anthony D Wiest
(74) *Attorney, Agent, or Firm* — Conley Rose, P.C.

(57) ABSTRACT

An offshore node deployment system includes a control system, a surface vessel including a deck, and a propulsion system in signal communication with the control system, a node storage container supported by the deck of the surface vessel, wherein the node storage container is configured to store a plurality of nodes which are physically disconnected from each other, and a node deployment system supported by the deck of the surface vessel and controllable by the control system, wherein the node deployment system is configured to retrieve the nodes from the node storage container and deploy the nodes to a subsea location.

28 Claims, 13 Drawing Sheets

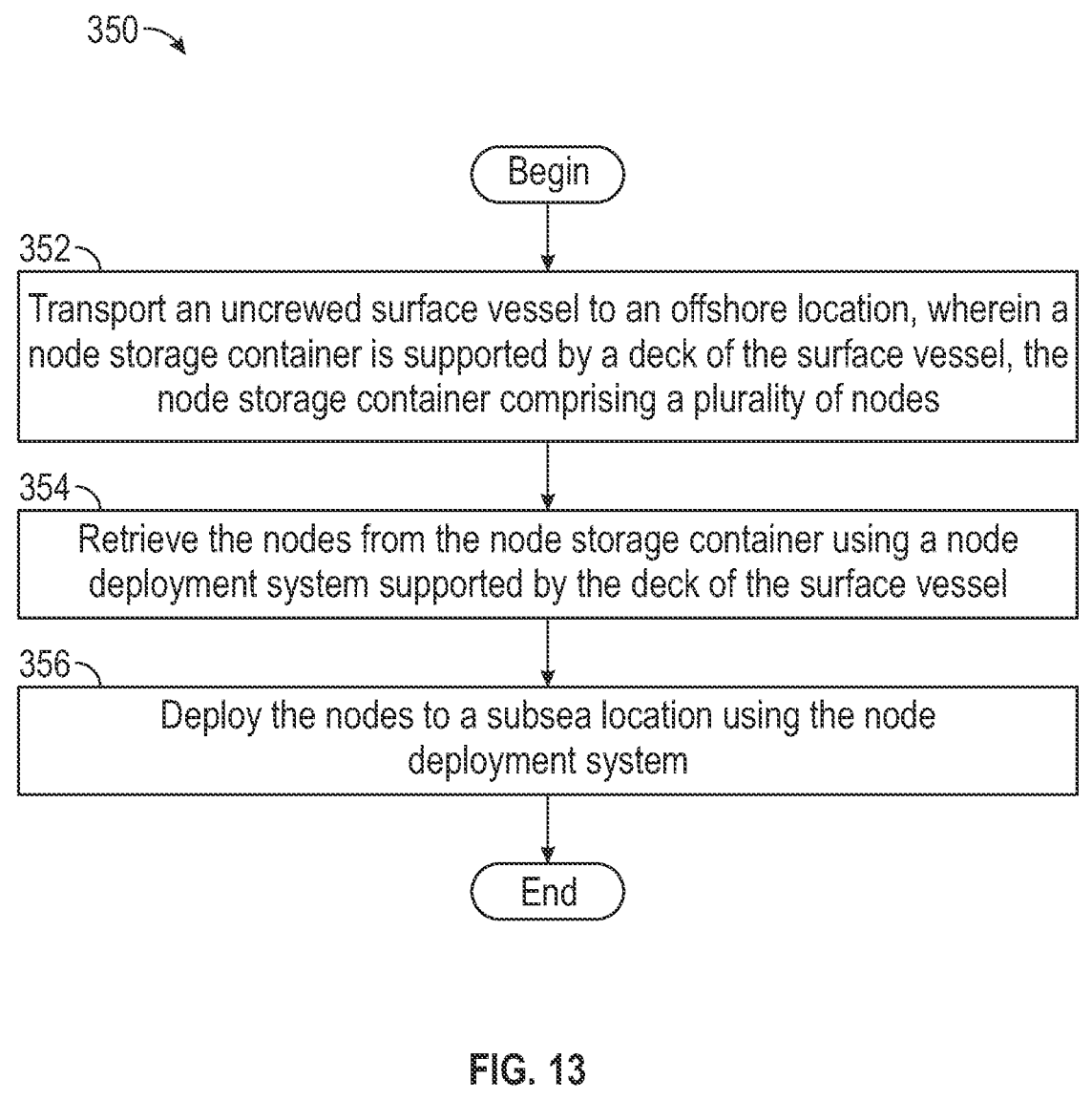

350

( Begin )

352

Transport an uncrewed surface vessel to an offshore location, wherein a node storage container is supported by a deck of the surface vessel, the node storage container comprising a plurality of nodes

354

Retrieve the nodes from the node storage container using a node deployment system supported by the deck of the surface vessel

356

Deploy the nodes to a subsea location using the node deployment system ( End )

FIG. 13

UNCREWED OFFSHORE NODE DEPLOYMENT SYSTEMS AND METHODS

CROSS-REFERENCE TO RELATED APPLICATIONS

This application claims benefit of U.S. provisional patent application Ser. No. 63/224,595 filed Jul. 22, 2021, and entitled "Uncrewed Offshore Node Deployment Systems and Methods," which is hereby incorporated herein by reference in its entirety for all purposes.

STATEMENT REGARDING FEDERALLY SPONSORED RESEARCH OR DEVELOPMENT

Not applicable.

BACKGROUND

Sensor arrays may be deployed in offshore subsea environments for a variety of applications. For example, exploration for hydrocarbon bearing subterranean formations may be conducted offshore utilizing the deployment of sensors subsea. In some applications, survey-based seismic exploration may be utilized to estimate properties of the subsurface beneath the sea floor based on reflected seismic waves. For example, a vessel may tow an array of seismic sensors (e.g., hydrophones, geophones, accelerometers etc.) to a desired location above the seabed. At the desired location, an acoustic source supported by the vessel may release one or more frequency-band limited sound waves toward the seabed. The sound waves may reflect off of subsurface formations beneath the seabed, back towards the surface where the reflected sound waves may be captured by the array of seismic sensors. The information captured by the array of seismic sensors, including the amount of time taken for the sound waves to reach the seismic array following their emission from the acoustic source, may be used to estimate or map the geology of the subsurface formations underlying the seabed. In some applications, the seismic array may be deployed directly onto the seabed as an ocean-bottom nodal (OBN) seismic survey in which seismic nodes are freely positioned (i.e., the nodes are not directly connected together) on the seabed.

In addition to OBN seismic surveys, other sensor arrays may be deployed to the seabed in applications other than hydrocarbon exploration. For example, asset integrity or monitoring sensor arrays comprising, for example, motion sensors, vibration sensors, strain sensors, pressure sensors, leak sensors, etc., may be deployed on the seabed to monitor subsea drilling, completion, and/or production equipment (e.g., wellhead, risers, production manifolds, pipelines, offshore wind substructures, etc.). Additionally, arrays comprising a plurality of communication devices such as subsea internet of things (SIoT) architecture may be deployed to the seabed to enable subsea wireless communication. Other examples may include seabed deployed sensor arrays used for environmental monitoring, metocean applications, and seabed subsidence monitoring.

SUMMARY

An embodiment of an offshore node deployment system comprises a control system, a surface vessel comprising a deck, and a propulsion system in signal communication with the control system, a node storage container supported by the deck of the surface vessel, wherein the node storage container is configured to store a plurality of nodes which are physically disconnected from each other, and a node deployment system supported by the deck of the surface vessel and controllable by the control system, wherein the node deployment system is configured to retrieve the nodes from the node storage container and deploy the nodes to a subsea location. In some embodiments, the surface vessel comprises a seismic source configured to emit an acoustic signal and the nodes comprise sensor nodes each configured to receive the acoustic signal. In some embodiments, the control system comprises a controller configured to control the node deployment system and a wireless communication system configured to receive signals from a remote pilot of the surface vessel for controlling the propulsion system and the node deployment system. In certain embodiments, the control system comprises a controller comprising a memory device that includes instructions for autonomously operating the propulsion system and the node deployment system. In certain embodiments, the node deployment system comprises a node transportation system supported by the deck of the surface vessel and configured to deposit the nodes received from the node storage container into a submersible node deployment container, a container deployment system supported by the deck of the surface vessel and configured to transport the node deployment container from the deck of the surface vessel to the subsea location, and a remotely operated underwater vehicle (ROV) supported by the deck of the surface vessel and configured to retrieve the nodes from the node deployment container. In some embodiments, the node transportation system comprises a robotic arm configured to retrieve the nodes from the node storage container and a conveyor configured to transport the nodes retrieved by the robotic arm. In some embodiments, the container deployment system comprises a lifting crane configured to lift the node deployment container from the deck of the surface vessel. In certain embodiments, the node deployment system is configured to retrieve an individual node from the node storage container and deploy the individual node to a subsea location. In certain embodiments, the control system comprises an artificial intelligence (AI) module configured to operate the node deployment system to retrieve the nodes from the node storage container and deploy the nodes to the subsea location. In some embodiments, at least a portion of the control system is not positioned on the surface vessel. In some embodiments, the node storage container comprises a node transporter configured to transport at least one of the plurality of nodes from a storage position within the node storage container to an exit position. In certain embodiments, the exit position is located at a position beyond an outer periphery of the deck of the surface vessel. In certain embodiments, the node transporter comprises a conveyor having a ramp extendable below a waterline.

An embodiment of an offshore node deployment system comprises a control system, a surface vessel comprising a deck, and a propulsion system in signal communication with the control system, a node storage container supported by the deck of the surface vessel, wherein the node storage container is configured to store a plurality of nodes, and a node deployment system supported by the deck of the surface vessel and controllable by the control system, wherein the node deployment system is configured to retrieve an individual node from the node storage container and deploy the node to a subsea location. In some embodiments, the surface vessel comprises a seismic source configured to emit an acoustic signal and the plurality of nodes comprise sensor nodes each configured to receive the acoustic signal. In some embodiments, the surface vessel comprises a modular surface vessel comprising a plurality of separable and releasably coupled modules including a propulsion module comprising the propulsion system, and a first node deployment module comprising the node deployment system. In certain embodiments, the surface vessel comprises a second node deployment module comprising another node deployment system. In certain embodiments, the node deployment system comprises a node transportation system supported by the deck of the surface vessel and configured to deposit the node received from the node storage container into a submersible node deployment container, a container deployment system supported by the deck of the surface vessel and configured to transport the node deployment container from the deck of the surface vessel to the subsea location, and a remotely operated underwater vehicle (ROV) system supported by the deck of the surface vessel and configured to retrieve the node from the node deployment container. In some embodiments, the node transportation system comprises a robotic arm configured to retrieve the node from the node storage container and a conveyor configured to transport the node retrieved by the robotic arm. In some embodiments, the container deployment system comprises a lifting crane configured to lift the node deployment container from the deck of the surface vessel. In certain embodiments, the node storage container is configured to store the plurality of nodes such that the plurality of nodes are free to move independently relative each other. In certain embodiments, the control system comprises an artificial intelligence (AI) module configured to operate the node deployment system to retrieve the node from the node storage container and deploy the node to the subsea location. In some embodiments, at least a portion of the control system is not positioned on the surface vessel. In some embodiments, the node storage container comprises a node transporter configured to transport the node from a storage position within the node storage container to an exit position. In certain embodiments, the exit position is located at a position beyond an outer periphery of the deck of the surface vessel. In certain embodiments, the node transporter comprises a conveyor having a ramp extendable below a waterline.

An embodiment of a method for deploying a plurality of nodes offshore comprises (a) transporting a surface vessel to an offshore location, wherein a node storage container is supported by a deck of the surface vessel, the node storage container comprises the plurality of nodes which are physically disconnected from each other, (b) retrieving the nodes from the node storage container using a node deployment system supported by the deck of the surface vessel, and (c) deploying the nodes to a subsea location using the node deployment system. In some embodiments, (a) comprises remotely piloting the surface vessel via a control system of the surface vessel from a remote location. In some embodiments, (b) comprises retrieving the nodes individually from the node storage container and (c) comprises deploying the nodes individually to the subsea location. In certain embodiments, (b) comprises (b1) retrieving the nodes individually from the node storage container using a robotic arm supported by the deck of the surface vessel, and (b2) transporting the nodes retrieved from the node storage container using a conveyor whereby the nodes are deposited into a node deployment container, and (c) comprises (c1) lifting the node deployment container from the deck of the surface vessel using a lifting crane and lowering the node deployment container towards a seabed using a tether, and (c2) retrieving the nodes individually from the node deployment container using a remotely operated underwater vehicle (ROV). In certain embodiments, (c) comprises transporting the nodes from the node storage container to an exit position that is spaced from the node storage container.

BRIEF DESCRIPTION OF THE DRAWINGS

For a detailed description of exemplary embodiments of the disclosure, reference will now be made to the accompanying drawings in which:

FIG. 13 is a flowchart illustrating a method for deploying nodes offshore according to some embodiments.

DETAILED DESCRIPTION

Figure 1:
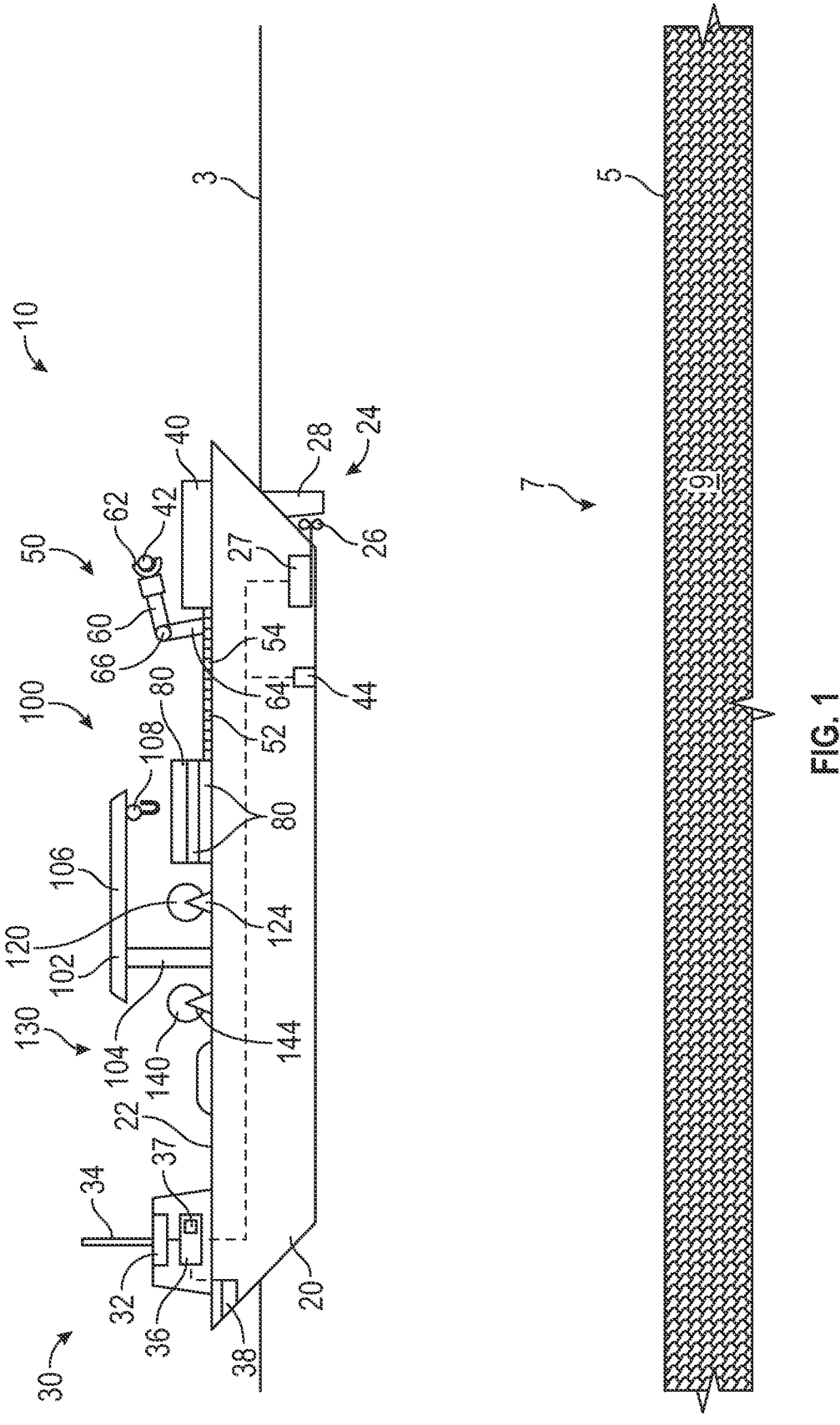
FIGS. 1-8 are schematic views of an uncrewed node deployment system deploying nodes according to a first node deployment method according to some embodiments.

The following discussion is directed to various exemplary embodiments. However, one skilled in the art will understand that the examples disclosed herein have broad application, and that the discussion of any embodiment is meant only to be exemplary of that embodiment, and not intended to suggest that the scope of the disclosure, including the claims, is limited to that embodiment.

Certain terms are used throughout the following description and claims to refer to particular features or components. As one skilled in the art will appreciate, different persons may refer to the same feature or component by different names. This document does not intend to distinguish between components or features that differ in name but not function. The drawing figures are not necessarily to scale. Certain features and components herein may be shown exaggerated in scale or in somewhat schematic form and some details of conventional elements may not be shown in interest of clarity and conciseness.

In the following discussion and in the claims, the terms "including" and "comprising" are used in an open-ended fashion, and thus should be interpreted to mean "including, but not limited to . . . " Also, the term "couple" or "couples" is intended to mean either an indirect or direct connection. Thus, if a first device couples to a second device, that connection may be through a direct connection, or through an indirect connection via other devices, components, and connections. In addition, as used herein, the terms "axial" and "axially" generally mean along or parallel to a central axis (e.g., central axis of a body or a port), while the terms "radial" and "radially" generally mean perpendicular to the central axis. For instance, an axial distance refers to a distance measured along or parallel to the central axis, and a radial distance means a distance measured perpendicular to the central axis.

As described above, sensor arrays may be deployed on offshore seabeds for a variety of purposes, including, for example, hydrocarbon exploration via OBN seismic surveys, the deployment of SIoT architecture, environmental monitoring, metocean applications, passive marine mammal monitoring, and seabed subsidence monitoring. In at least some of these applications, a plurality of sensor nodes are deployed from a surface vessel to a desired location on the seabed.

As used herein, the term "sensor node" is defined as meaning a discrete, subsea deployable sensor package having one or more sensors and which are free to move independently relative to each other. Sensor nodes may include various kinds of sensors including seismic, acoustic, acceleration, displacement, salinity, temperature, and/or other sensors for measuring various types of data associated with subsurface earthen formations and other phenomena including local sea conditions. Sensor nodes may be loosely coupled together via a flexible cable or line but are permitted to move relative to each other and are not in direct signal communication whereby a first sensor node may communicate (e.g., via a wired or wireless communication link) directly with a second sensor node.

The sensor nodes may be freely deployed whereby sensor nodes are not directly connected together contra to other deployment techniques such as ocean-bottom cable (OBC) techniques. Sensor nodes may comprise "dumb" sensor nodes which cannot control their own trajectory and thus must be positioned over or guided towards a target destination. Alternatively, sensor nodes may comprise "smart" or "autonomous" sensor nodes capable of navigating itself towards a target destination using a propulsion system (e.g., a water jet having thrust vectoring, a propeller combined with one or more adjustable control surfaces) of the autonomous sensor node. The autonomous sensor nodes may be remotely controlled by a human operator but more commonly are guided in accordance with instructions provided by a control system which is at least partially embedded in the autonomous sensor node. It may be understood that as used herein, the term "autonomous" and "autonomously" embraces both partially autonomous control schemas in which a human operator remains within the control loop (e.g., as a final authority) and fully autonomous control schemas in which a human is not within the control loop. It may be understood that the "instructions" which may be embedded in control systems (e.g., within one or more memory devices of the control system) may include artificial intelligence (AI) and machine learning architecture.

Given that the sensor nodes of OBN seismic surveys are freely deployed, OBN surveys may offer advantages over OBC survey techniques given that the number of sensor nodes deployed in an OBN seismic survey may be conveniently adjusted to suit a particular operation, something that may not be possible with OBC techniques where a fixed number of sensors are coupled along a given cable. The scalability inherent in nodal deployment techniques relative to deployment techniques in which the sensors are coupled together along a cable or other member may appear in applications other than seismic surveys as well.

While OBN seismic survey operations offer advantages in scalability relative to OBC survey techniques, OBN seismic survey operations may require a relatively large vessel (e.g., 40 meters or greater in length) and a relatively large crew (e.g., twenty or more people) to operate the surface vessel, prepare and assist in the deployment of the plurality of sensor nodes, and assist with the retrieval and storage of the sensor nodes following their deployment. Given the relatively large vessel and crew which may be employed during an OBN seismic survey, or other operations involving the free deployment of a large number of physically separate sensor nodes, the costs associated with OBN operations may be relatively high compared to other sensor array deployment techniques in which the sensors are coupled together and thus may be deployed in a relatively more convenient manner, such as via a cable, for example. The relatively large size of the vessel and presence of the crew may also inhibit the vessel from operating in some environments, such as areas in proximity to offshore infrastructure which may pose a danger to the large vessel or vice versa.

Accordingly, embodiments of uncrewed offshore nodal sensor deployment systems and methods are disclosed herein. Embodiments of uncrewed offshore nodal sensor deployment systems may include an uncrewed surface vessel comprising a deck, a control system and a propulsion system in signal communication with the control system, a node storage container supported by the deck of the uncrewed vessel, wherein the node storage container is configured to store a plurality of nodes which are physically disconnected from each other, and a node deployment system supported by the deck of the uncrewed vessel and controllable by the control system, wherein the node deployment system is configured to retrieve the nodes from the node storage container and deploy the nodes into the water or to a subsea location. In some embodiments, the node deployment system is configured to retrieve an individual node from the node storage container and deploy the node to a subsea location.

The uncrewed systems and methods described herein may allow the usage of relatively smaller surface vessels given that accommodations for a crew are not required, thereby minimizing the cost of operating the uncrewed vessel. Additionally, uncrewed surface vessels described herein may operate in environments that are too dangerous for relatively large crewed vessels to operate, such as in proximity to offshore infrastructure like offshore production platforms or other industrial infrastructure, and/or in harsh weather conditions. As will be described further herein, uncrewed systems described herein may be modularized such that the uncrewed vessel may comprise a plurality of releasably coupled modules which may be tailored to a specific application.

Referring now to FIG. 1, an embodiment of an uncrewed offshore node deployment system 10 is shown. In this exemplary embodiment, system 10 generally includes a surface vessel 20 which is uncrewed in this exemplary embodiment, a plurality of node storage containers 40 containing a plurality of nodes or sensor nodes 42, a node transportation system 50, a plurality of submersible node deployment containers (of various designs to accommodate the sensor node dimensions) 80, a container deployment system 100, and a remotely operated underwater vehicle (ROV) system 130. In this exemplary embodiment, surface vessel 20 comprises a surface ship; however, in other embodiments, surface vessel 20 may comprise other types of vessels. Surface vessel 20 generally includes a deck 22 positioned above a waterline 3, a propulsion system 24, and a control system 30. Each of node storage container 40, node transportation system 50, and node deployment containers 80, container deployment system 100, and ROV system 130 may each be positioned on and supported by deck 22 of surface vessel 20. The node transportation system 50, node deployment containers 80, and container deployment system 100 may collectively comprise a node deployment system of system 10.

In this exemplary embodiment, propulsion system 24 generally includes a propeller 26 configured to propel vessel 20 and a rudder 28 configured to steer vessel 20. Propeller 26 may be powered by one or more engines 27 of surface vessel 20. In other embodiments, the configuration of propulsion system 24 may vary. For example, in other embodiments, propulsion system 24 may comprise a water-jet propulsion system. Propulsion system 24, including both propeller 26 and rudder 28, may be controlled by the control system 30 of surface vessel 20. In this exemplary embodiment, control system 30 of surface vessel 20 generally includes a communication system 32, a controller 36, and a sensor package or suite 38.

In this exemplary embodiment, communication system 32 comprises a wireless communication system including an antenna 34 configured to communicate with a command center (not shown in FIG. 1) located distal the surface vessel 20. Communication system 32 may communicate wirelessly with the command center via a variety of wireless communication protocols including communication via radio and/or satellite. Thus, in some embodiments, communication system 32 may comprise a radio transceiver. Controller 36 of control system 30 comprises a computer system including one or more memory devices 37 and one or more processors and is in signal communication with both communication system 32 and one or more components of propulsion system 24, such as engine 27. Controller 36 may comprise a singular controller or computer system or a plurality of controllers or computer systems distributed about the surface vessel 20.

The sensor package 38 of control system 30 comprises a plurality of different sensors in signal communication with communication system 32 and controller 36 and which may be used to provide information regarding the position, bearing, and other information pertaining to surface vessel 20 and the environment surrounding vessel 20. For example, sensor package 38 may comprise one or more video cameras (e.g., 360 degree video cameras having day and night vision, etc.), wind speed sensors, temperature sensors, microphones, speakers, barometers, radar, proximity sensors, and/ or navigation or positional sensors such as global navigation satellite system (GNSS) sensors for timing and positioning information etc. The types of sensors included in sensor package 38 may vary significantly depending on the particular application. The sensors of sensor package 38 may be in signal communication with communication system 32 and controller 36 and thus the information captured by sensor package 38 may be transmitted wirelessly to the command center via the antenna 34 of communication system 32.

In this exemplary embodiment, propulsion system 24 of surface vessel 20 is controlled remotely via a pilot located at the command center via the control system 30. For example, in this exemplary embodiment, information pertaining to the surface vessel 20 and surrounding environment may be provided to the pilot of surface vessel 20 at the command center via communication system 32, thereby allowing the pilot to operate the surface vessel 20 remotely at the command center. In other embodiments, surface vessel 20 may not be controlled by a pilot located at a remote location. Instead, surface vessel 20 may be operated autonomously by control system 30 without guidance from a remote pilot. For example, an operational or mission plan may be saved in the memory device 37 of controller 36, the operational plan comprising directions to a desired location at which the sensor nodes 42 are to be deployed as well as exclusion zones to avoid, operational limits such as sensor sea state, proximity to other vessels and/or infrastructure with a failsafe state defined outside of these predefined limits. In some embodiments, the operational plan may be created and/or executed by an artificial intelligence (AI) algorithm or module stored in memory device 37 and/or in a memory device remote of surface vessel 20. The operational plan may also include instructions for operating the node transportation system 50, container deployment system 100, and ROV system 130 in order to deploy the sensor nodes 42 at the desired location without requiring intervention by a remote pilot. Sensor package 38 may provide feedback to the controller 36 as controller 36 executes the operational plan stored in the memory device 37 thereof. In some embodiments, control system 30 may comprise a position holding or dynamic positioning system configured to maintain a stationary position of the vessel 20 with respect to a global reference frame irrespective of wind and currents. In some embodiments, autonomous operation by control system 30 of surface vessel 20 may include a failsafe mode of operation in the event that the surface vessel 20 should lose communication with an offboard controller or pilot. For example, the failsafe operational mode of control system 30 may cause the surface vessel 20 to remain stationary or to anchor in place until communications are restored.

Sensor nodes 42 are stored within node storage container 40 as the surface vessel 20 travels from an initial location (e.g., a dock where vessel 20 is supplied with sensor nodes 42, for example) to a location offshore located above or near a desired subsea location 7 where the sensor nodes 42 will be deployed to the seabed 5. Node storage container 40 may comprise a bin, tray, rack or other devices configured to store sensor nodes 42 and, in this exemplary embodiment, sensor nodes 42 may be loosely stored (e.g., they are not secured to container 40) within node storage container 40, or stored in discrete compartments within container 40. Node transportation system 50 of surface vessel 20 is generally configured to transport sensor nodes 42 from the node storage container 40 to the node deployment containers 80 wherein the sensor nodes 42 may be deployed subsea.

In this exemplary embodiment, node transportation system 50 generally includes a node conveyor 52 and a robotic arm 60 each positioned on the deck 22 of surface vessel 20. Robotic arm 60 includes a gripper 62 and an articulatable arm 64 coupled to the gripper 62 and the deck 22. Gripper 62 may be actuatable between an open position configured to receive a sensor node 42 and a closed position (shown in FIG. 1) configured to secure or grab a sensor node 42 received therein. Alternatively, robotic arm 60 may comprise suction device and/or a hook or other mechanism to attach to a sensor node 42. Articulatable arm 64 comprises one or more joints 66 configured to permit gripper 62 to rotate relative a plurality of distinct axes relative to the deck 22. In this configuration, robotic arm 60 is configured to grab singular sensor nodes 42 loosely or otherwise positioned in node storage container 40, retrieve the sensor nodes 42 from node storage container 40, and deposit the retrieved sensor nodes 42 onto node conveyor 52 of node transportation system 50.

In this exemplary embodiment, node conveyor 52 of node transportation system 50 comprises a conveyor belt 54 that extends along deck 22 and between node storage container 40 and node deployment containers 80. Robotic arm 60 may deposit the sensor nodes 42 retrieved from node storage container 40 onto the conveyor belt 54 which may transport the sensor nodes 42 to the node deployment containers 80. Node deployment containers 80 may be positioned adjacent an end of the conveyor belt 54 such that sensor nodes 42 may fall directly into a desired node deployment container 80. For example, node deployment containers 80 may be positioned on an elevator of deck 22 such that the desired node deployment container 80 may be aligned directly adjacent the end of conveyor belt 54. In other embodiments, a second robotic arm (not shown in FIG. 1) positioned at the end of conveyor belt 54 adjacent node deployment containers 80 may retrieve sensor nodes 42 from conveyor belt 54 and deposit the retrieved sensor nodes 42 into the desired node deployment container 80. In still other embodiments, node transport system 50 may not include conveyor 52 and instead, after having retrieved a sensor node 42 from node storage container 40, robotic arm 60 may travel across deck 22 of surface vessel (e.g., via a track positioned on deck 22) to deposit the retrieved sensor node 42 into the desired node deployment container 80.

Robotic arm 60 may repeatedly deposit sensor nodes 42 onto conveyor belt 54 which may then be deposited into the desired node deployment container 80 until a desired number of sensor nodes 42 have been deposited into the desired node deployment container 80. This process may be repeated for each of the node deployment containers 80 disposed on the deck 22 of surface vessel 20 such that each node deployment container 80 of surface vessel 20 is filled with a desired number of sensor nodes 42. In this exemplary embodiment, conveyor belt 54 and robotic arm 60 of conveyor system 50 are controlled through the controller 36 of control system 30 either by a remotely located pilot of surface vessel 20 or autonomously via an operational plan stored in the memory device 37 of controller 36.

The deployment containers 80 of surface vessel 20 provide containers in which sensor nodes 42 may be transported during their journey from surface vessel 20 to the seabed 5 below. Deployment containers 80 comprise a bin, tray, or other devices configured to store sensor nodes 42 and, in this exemplary embodiment, sensor nodes 42 may be loosely stored (e.g., they are not secured to containers 80) within node storage containers 40. The container deployment system 100 is generally configured to transport each container 80, after being filled with a desired number of sensor nodes 42, from the surface vessel 20 to a location at or proximal to the desired subsea location 7. Deployment containers 80 may encompass various designs (e.g., square, rectangular, circular or other shapes) to accommodate the dimensions of sensor nodes 42 which may be stacked one or more layers deep within deployment containers 80. Additionally, in some embodiments, deployment containers 80 may include a transport mechanism (e.g., a robotic arm, conveyer system, etc.) configured to transport the sensor nodes 42 from a storage location within the node deployment container 80 to an exit location or point from whence the sensor node 42 may be ejected (e.g., slide/drop via gravity) from the node deployment container 80).

Figure 2:
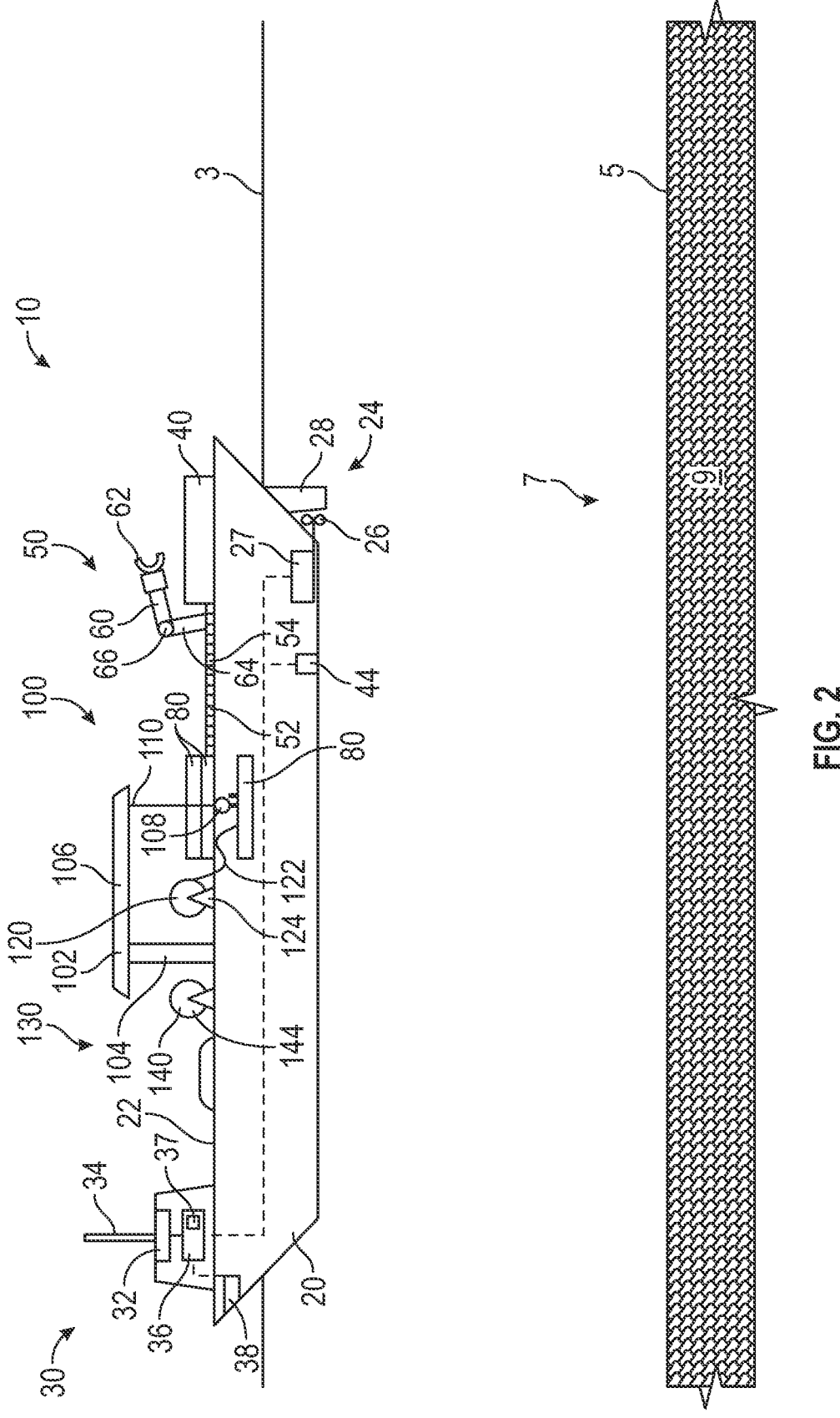
Figure 3:
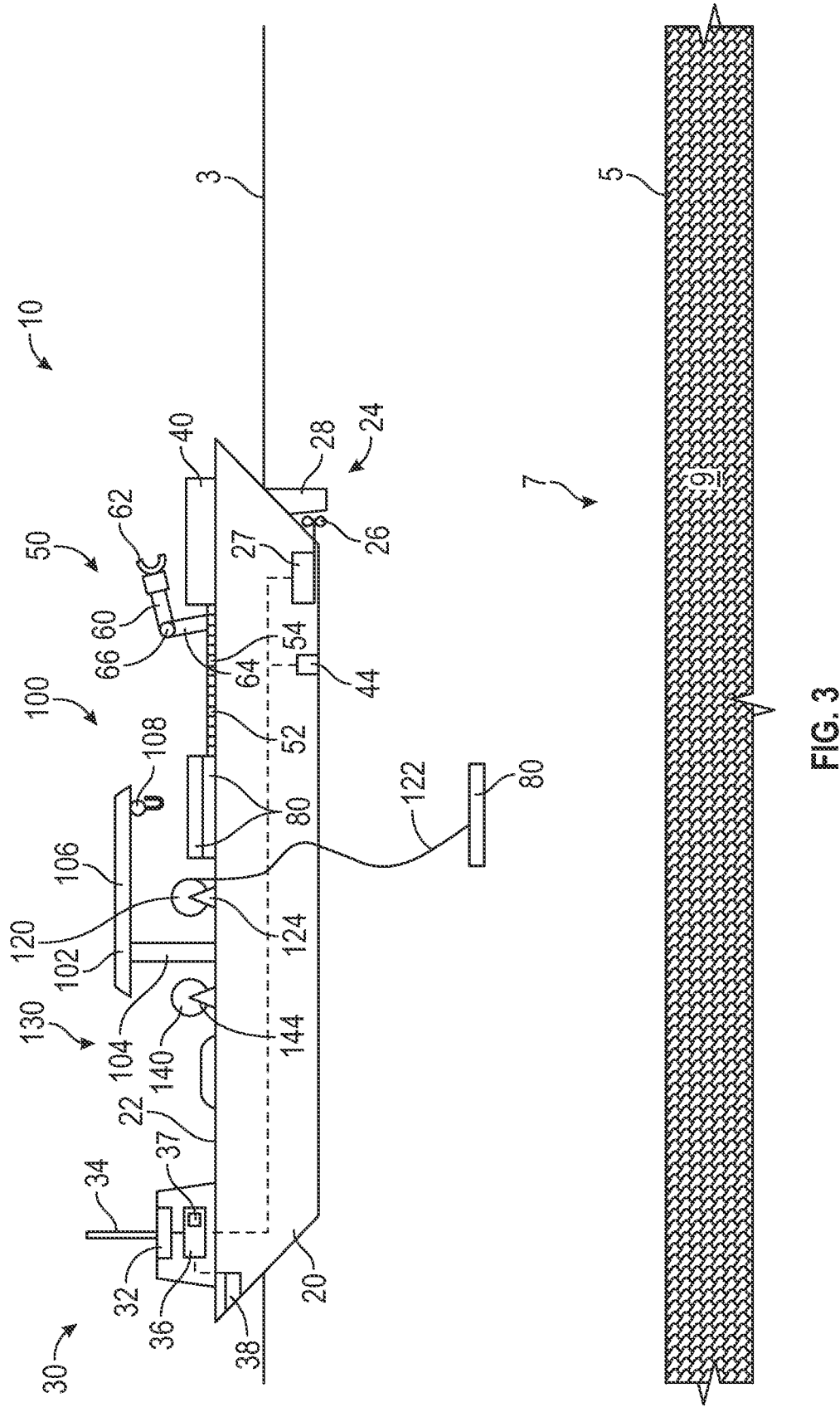

Referring to FIGS. 2, 3, in this exemplary embodiment, container deployment system 100 generally includes a lifting crane 102 and a tether system 120. In some embodiments, the lifting crane 102 and/or tether system 120 of container deployment system 100 may be controlled remotely via a sensor package of system 100 including cameras, tilt meters, and/or other equipment such as health sensors, etc. Lifting crane 102 of system 100 is generally configured to lift each filled deployment container 80 from the deck 22 and over the side of surface vessel 20 where the deployment container 80 may be lowered below the waterline 3. In other embodiments, lifting crane 102 may be configured to deploy container 80 from deck 22 through a moon-pool of surface vessel 20 rather than over the side thereof. Lifting crane 102 generally includes a mast 104, a jib 106 extending from a terminal end of the mast 104, and a hook block 108 coupled to the jib 106. Mast 104 may be pivotably mounted to deck 22 of surface vessel 20 whereby mast 104 may rotate about a vertical axis extending from deck 22. Additionally, hook block 108 may comprise a hook and may be transportable along the length of the jib 106 (in a direction parallel deck 22) via a trolley coupled between hook block 108 and jib 106. Further, hook block 108 may be lowered from mast 104 by a wire or cable 110 extending from the jib 106. The hook of hook block 108 is configured to releasably couple with the node deployment containers 80 whereby hook block 108 may lift a desired node deployment container 80 off the deck 22 and lower the node deployment container 80 towards the waterline 3 as shown in FIG. 2.

In this exemplary embodiment, the tether system 120 of container deployment system 100 comprises a tether 122 which may be extended from and retracted to a motorized winch 124 positioned on the deck 22 of surface vessel 20. Tether 122 may be connected to the node deployment container 80 prior to the container 80 being lifted from the deck 22 by lifting crane 102. For example, a separate tether 122 may be connected to each node deployment container 80 prior to surface vessel 20 departing the initial location. Alternatively, a single tether 122 may be connected, by remote control and/or autonomously, to node deployment containers 80 sequentially as the containers 80 are deployed to the seabed 5. For example, a robotic arm or other mechanism may attach the tether 122 to one of the node deployment containers 80 while the surface vessel 20 is offshore distal the initial location. In this exemplary embodiment, both the lifting crane 102 and the motorized winch of container deployment system 100 are controlled through controller 36 of control system 30 either by a remotely located pilot of surface vessel 20 or autonomously via an operational plan stored in the memory device 37 of controller 36. In some embodiments, tether 122 may allow for remote communication with a transport mechanism of the node deployment container 80 whereby the transport mechanism may be instructed to transport one or more sensor nodes 42 stored therein to an exit location of the node deployment container 80 from whence the sensor node 42.

As shown particularly in FIG. 3, after the desired node deployment container 80 has been lowered to the waterline 3, hook block 108 may be disconnected from the node deployment container 80 and the container 80 may be allowed to descend towards the seabed 5 as it is suspended from the surface vessel 20 by tether 122. Tether 122 may ensure that the suspended node deployment container 80 does not drift away from the desired subsea location 7 to which the sensor nodes 42 are to be deployed. Particularly, the suspended node deployment container 80 may be lowered through the water in a controlled manner by the winch 124, such as via the selective operation of a brake of the winch 124 which is controlled by controller 36. In this exemplary embodiment, once the suspended node deployment container has been lowered to the seabed 5, the tether 122 may be disconnected from the node deployment container 80 and retracted to the surface vessel 20 such as via a motor of winch 124 that is controlled by the controller 36. For example, the connection formed between tether 122 and the deployed node deployment container 80 may be releasable in response to the application of a sufficient force applied to the tether 122 from the winch 124 (e.g., in response to the operation of the motor of winch 124).

Figure 4:
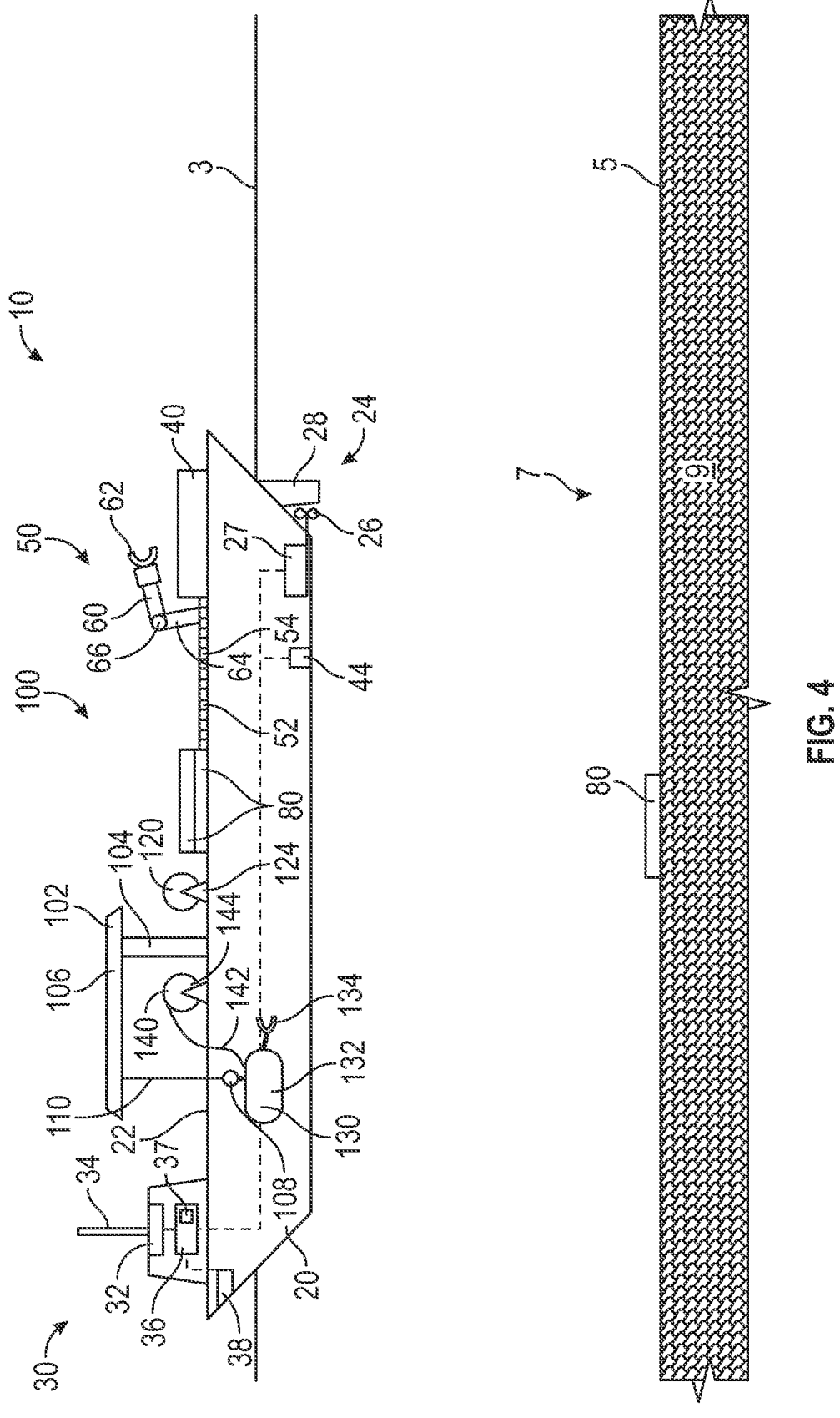
Figure 5:
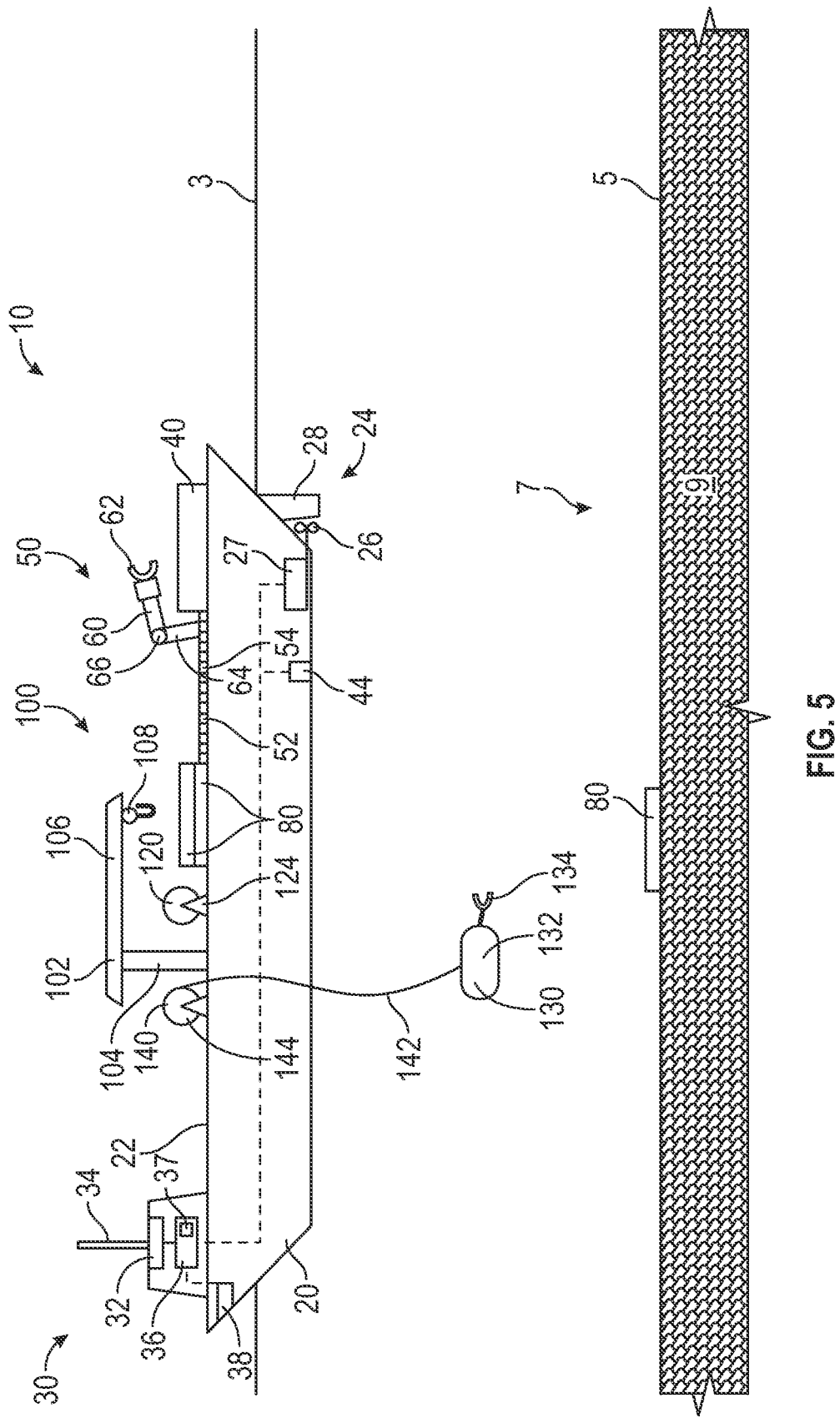

Referring to FIGS. 4, 5, ROV system 130 of surface vessel 20 is generally configured to deploy a plurality of sensor nodes 42 from a subsea positioned node deployment container 80 to the seabed 5 at the desired subsea location 7. Particularly, ROV system 130 may deploy the sensor nodes 42 such that they are freely positioned along the seabed 5 such that the sensor nodes 42 are not connected together and thus are free to move relative to each other. In this exemplary embodiment, ROV system 130 generally includes a ROV 132 and an umbilical system 140. ROV 132 is submersible and may be remotely piloted. In this exemplary embodiment, ROV 132 comprises a gripper arm 134 similar in configuration to gripper 62 and configured to selectively actuate between an open position configured to receive one of the sensor nodes 42 and a closed position configured to secure the sensor node 42 received therein.

In this exemplary embodiment, umbilical system 140 generally includes an umbilical 142 which may be extended from and retracted to a motorized winch 144 positioned on the deck 22 of surface vessel 20. Umbilical 142 may be connected to the ROV 132 prior to the departure of surface vessel 20 from the initial location. Electrical power, signals as well as pressurized fluids and/or other materials may be communicated between ROV 132 and the surface vessel 20 via umbilical 142. ROV 132 via umbilical 142 may activate sensor nodes 42 (e.g., turn on node recording, etc.), retrieve and store information specific to the deployed sensor nodes 42 such as serial number and device status information, transmit to GNSS of the deployed sensor nodes 42 synchronized timing information and target location as per an operational plan, etc. Alternatively, in another embodiment, node deployment container 80 may eject a node to land on the seabed 5 once the target location is reached by the surface vessel 20.

In this exemplary embodiment, ROV 132 is piloted remotely by the pilot of surface vessel 20 located at the command center using the control system 30 of surface vessel 20. For instance, commands from the pilot may be communicated to the ROV 132 via control system 30 and umbilical 142. ROV 132 may also include one or more sensors (e.g., video cameras, thermal imaging, etc.) which may provide information to the remote pilot via umbilical 142 and control system 130. In other embodiments, controller 36 of control system 30 may control the operation of ROV 132 autonomously and without intervention from a remote pilot in accordance with an operational plan and control system. The operational plan may be stored on the ROV 132 and/or on the surface vessel 20 in, for example, memory device 37 of controller 36. The operational plan may include, for example, a computer vision and machine learning modules which convert real time sensor feeds from the ROV 132 into actions to be performed by the ROV 132.

In this exemplary embodiment, following the retraction of tether 122 to the surface vessel 20, mast 104 of lifting crane 102 may be rotated to position the hook block 108 above ROV 132 as shown particularly in FIG. 4. In this configuration, hook block 108 may be lowered from jib 106 such that it releasably couples to ROV 132. With hook block 108 coupled to ROV 132, lifting crane 102 may lift ROV 132 from deck 22 of surface vessel 20 and subsequently lower ROV 132 towards the waterline 3. Once ROV 132 has been lowered into the water, hook block 108 may be disconnected from ROV 132 and retracted towards jib 106 so that ROV 132 may travel towards the node deployment container 80 positioned on the seabed 5, as shown particularly in FIG. 5. Although in this embodiment lifting crane 102 is used to deploy the ROV 132 from the deck 22 of surface vessel 20 to the waterline 3, in other embodiments, a separate crane or other device may be used to deploy ROV 132 over the side of surface vessel 20 or via a moon pool thereof.

Figure 6:
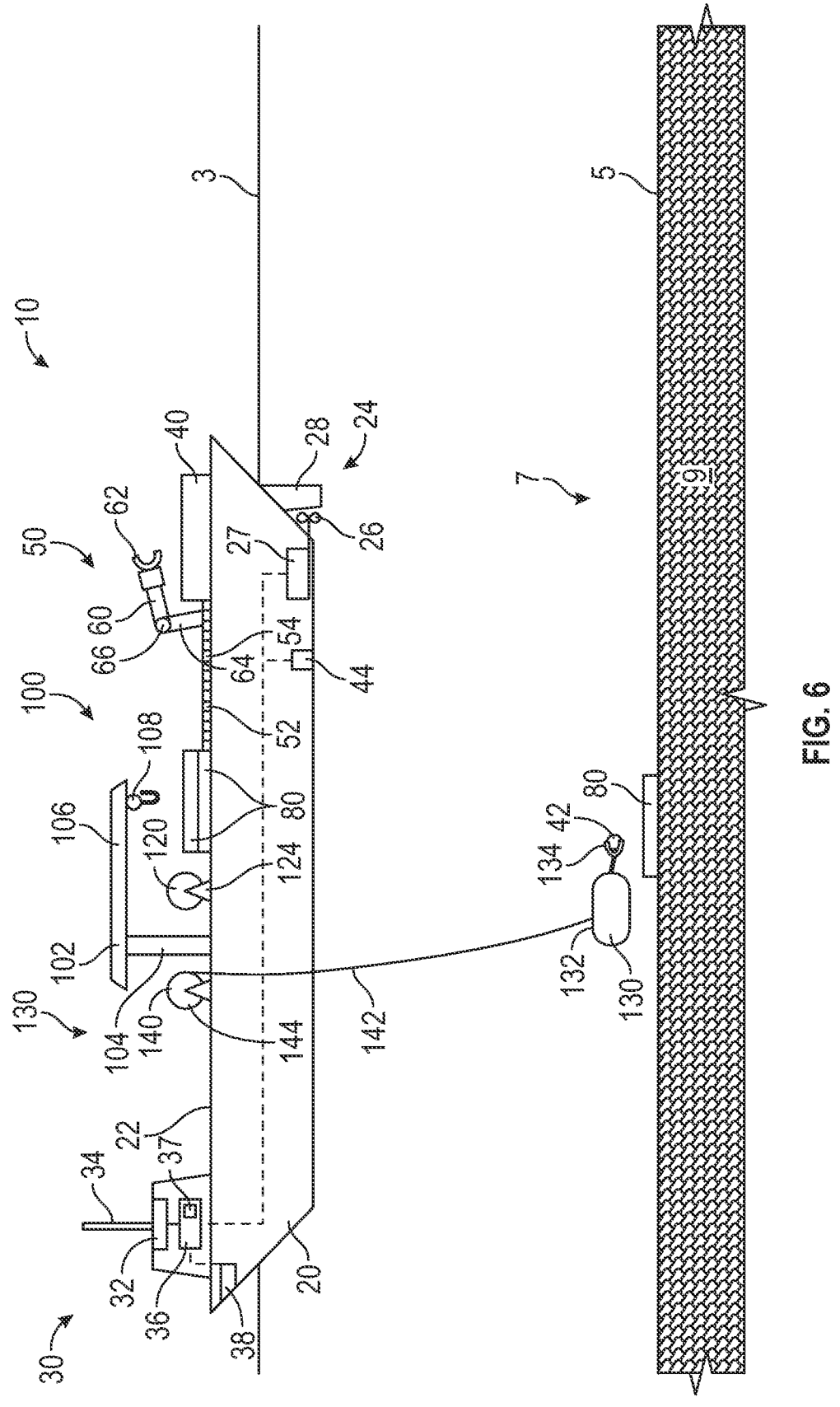
Figure 7:
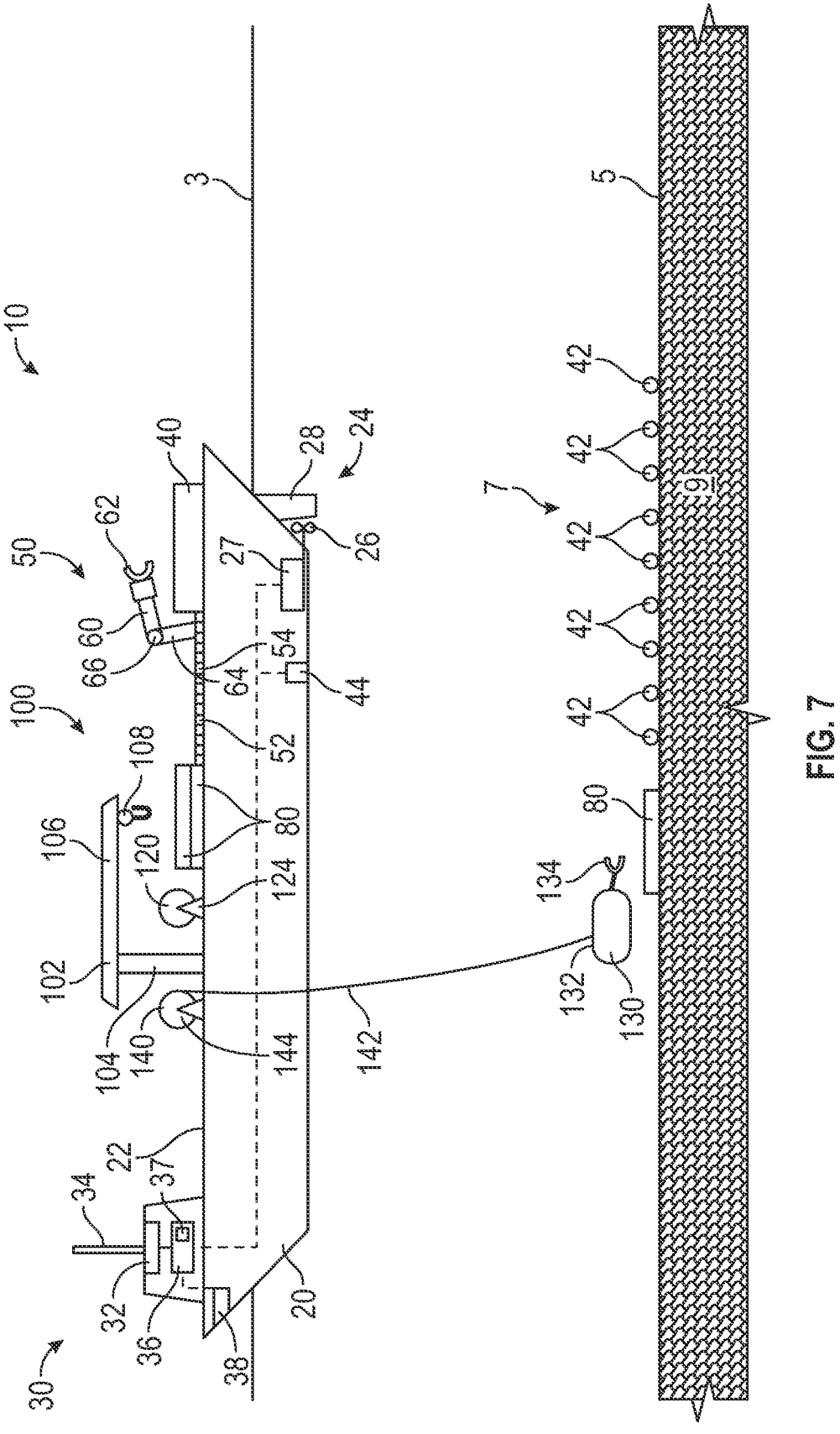
Figure 8:
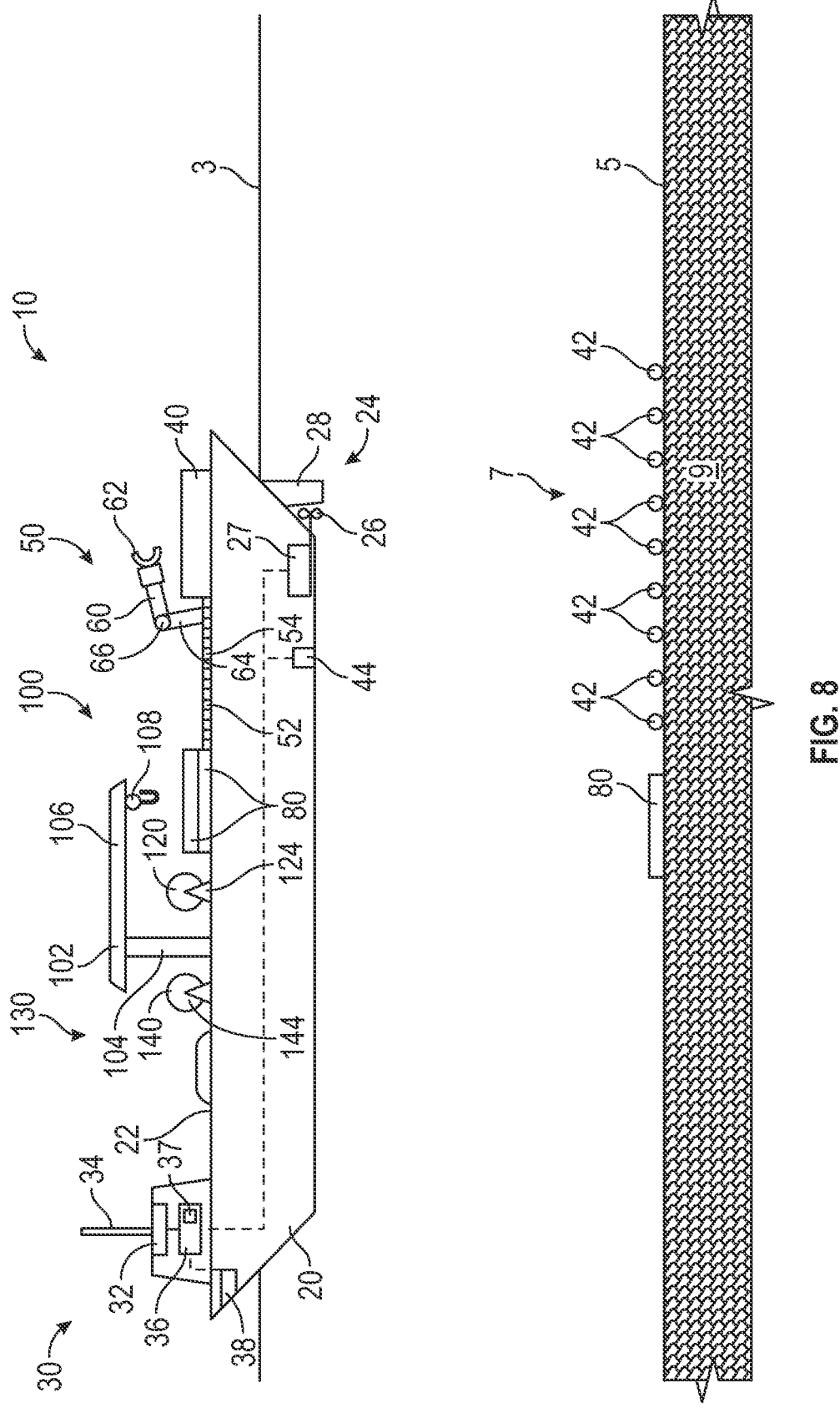

Referring to FIGS. 6-8, with ROV 132 now disconnected from lifting crane 102 and positioned in the water at or below the waterline 3, ROV 132 may travel towards the node deployment container 80 positioned at the seabed 5.

Once ROV 132 is in proximity to the node deployment container 80, ROV 132 may use grabber arm 134 to retrieve a sensor node 42 positioned in container 80, as shown particularly in FIG. 6. Having retrieved one of the sensor nodes 42 from node deployment container 80, ROV 132 may travel towards and deposit the retrieved sensor node 42 at the desired subsea location 7 along the seabed 5. Additionally, ROV 132 may also deactivate the sensor node 42 (e.g., turn off node recording), retrieve and store information specific to the retrieved sensor node 42 such as serial number and/or device status information, and transmit to GNSS of the retrieved sensor node 42 synchronized timing information and target location as per an operational plan, etc. This process may be repeated until each of the sensor nodes 42 contained in the node storage container 40 has been retrieved by ROV 132 and deposited along the seabed 5 at the desired subsea location 7, as shown particularly in FIG. 7. The sensor nodes 42 deployed at desired subsea location 7 may be arranged in any advantageous pattern desired by either the remote pilot of ROV 132 or in accordance with an operational plan stored in the memory device 37 of the controller 36 of control system 30. Once ROV 132 has deposited each sensor node 42 at the desired subsea location 7, ROV 132 may return to the waterline 3 where it may be retrieved to the deck 22 of surface vessel 20. Particularly, hook block 108 of lifting crane 102 may be lowered from jib 106 and releasably coupled to the ROV 132 positioned at the waterline 3. In some embodiments, lifting crane 102 may be operated remotely by a human operator and/or autonomously in accordance with an operational plan and/or via an AI module stored in the memory device 37 of controller 36 and/or stored remotely in another computer system. With hook block 108 connected to ROV 132, hook block 108 may be retracted towards jib 106 to lift ROV 132 out of the water and to return ROV 132 to the deck 22 of surface vessel 20, as shown particularly in FIG. 8.

In this embodiment, sensor nodes 42 each comprise seismic sensors and surface vessel 20 additionally comprises a seismic source 44 in signal communication with the controller 36 of control system 30. For instance, each sensor node 42 may comprise a hydrophone, a geophone, and/or other sensors configured to sense seismic signals. In other embodiments, sensor nodes 42 may comprise other types of sensors such as asset integrity or monitoring sensor arrays comprising, for example, motion sensors, vibration sensors, strain sensors, pressure sensors, leak sensors, passive acoustic and/or noise monitoring sensors etc. In still other embodiments, sensor nodes 42 may comprise equipment in addition to or other than sensors, such as wireless communication devices including SIoT architecture.

The seismic source 44 of surface vessel 20 is configured to emit a sound wave or acoustic signal transmittable through the water and which may penetrate a subterranean earthen formation 9 formed below the seabed 5. The acoustic signal may reflect off of materials disposed within the earthen formation 9 and these reflected waves may be detected by sensor nodes 42 and stored as information in a memory device of each sensor node 42. The information captured by sensor nodes 42, including the amount of time taken for the acoustic signal to reach the sensor nodes 42 following their emission from the seismic source 44, may be used to estimate or map the geology of the earthen formation 9 underlying seabed 5. In this embodiment, the operation of seismic source 44 is controlled by the pilot of surface vessel 20 at the command center through the control system 30 of surface vessel 20. However, in other embodiments, seismic source 44 may be controlled autonomously by the controller 36 of control system 30 in accordance with an operational plan stored in the memory device 37 of controller 36. The operational plan may be created and/or executed by an AI module stored in memory device 37 or in a separate computer system (e.g., a network server, a cloud computing system, etc.) remote surface vessel 20. As described above, the operational plan may comprise exclusion zones to avoid, operational limits specific to the seismic source 44 and/or other equipment, proximity to other vessels and/or infrastructure with a fail-safe state defined outside of these predefined limits. Additionally, while control system 30 is described herein as being configured for controlling the operation of surface vessel 20, including its current trajectory, it may be understood that in other embodiments a control system separate and distinct from control system 30 may be responsible for controlling the operation of surface vessel 20 (e.g., for controlling engines 27 of surface vessel 20).

Following a desired number of actuations of seismic source 44, the deployed sensor nodes 42 may be retrieved to the surface vessel 20 so that the surface vessel 20 may either travel to a location positioned above a second desired subsea location where additional sensor nodes 42 may be subsequently deployed, or the surface vessel 20 may return to the initial location where the information captured by the sensor nodes 42 may be extracted and analyzed. In this embodiment, ROV 132 may be redeployed to the seabed 5 via lifting crane 102 where ROV 132 may repeatedly retrieve the sensor nodes 42 deployed at the desired subsea location 7 and deposit them into the node deployment container 80 positioned on the seabed 5. In this embodiment, once all sensor nodes 42 have been collected in node deployment container 80, the ROV 132 may return to the surface vessel 20 where it may be loaded onto deck 22 by lifting crane 102. In other embodiments, ROV 132 may remain near the seabed 5 during the actuation of seismic source 44.

Before ROV 132 is stowed on surface vessel 20, the tether 122 may be lowered towards the seabed 5 and ROV 132 couple to the node deployment container 80 positioned thereon. ROV 132 may be controlled by a human operator and/or autonomously in accordance with a predefined operational plan and/or via an AI module stored in the memory device 37 and/or in a separate computer system (e.g., a network server, a cloud computing system, etc.) remote surface vessel 20. With tether 122 coupled to node deployment container 80, tether 122 and ROV 132 may be retracted through the operation of winch 124 to raise the node deployment container 80 and ROV 132 to at or near the waterline 3. In this position, lifting crane 102 may be utilized to lift the node deployment container 80, along with the information bearing sensor nodes 42, and then the ROV 132 onto the deck 22 of surface vessel 20. In other embodiments, sensor nodes 42 may be retrieved from seabed 5 in ways other than that described above. In still other embodiments, sensor nodes 42 may remain on the seabed 5 and the information captured by sensor nodes 42 may be optically harvested and/or wirelessly communicated to either surface vessel 20 or ROV 132.

In some embodiments, rather than sequentially lowering a node deployment container 80 and the ROV 132 towards the seabed 5, as shown in FIGS. 3-6, node deployment container 80 and ROV 132 may be lowered in parallel towards the seabed 5 in parallel so as to minimize the time required to deploy sensor nodes 42. For example, referring to FIG. 9, lifting crane 102 may be utilized to lift a node deployment container 80 from the deck 22 of surface vessel 20 and to lower the container onto the waterline 3. Once lifting crane 102 has placed node deployment container 80 into the water, it may be utilized to lift ROV 132 from the deck 22 of surface vessel 20 and to lower ROV 132 onto the waterline 3. In other embodiments, the deployment of node container 80 and ROV 132 may be reversed.

Figure 9:
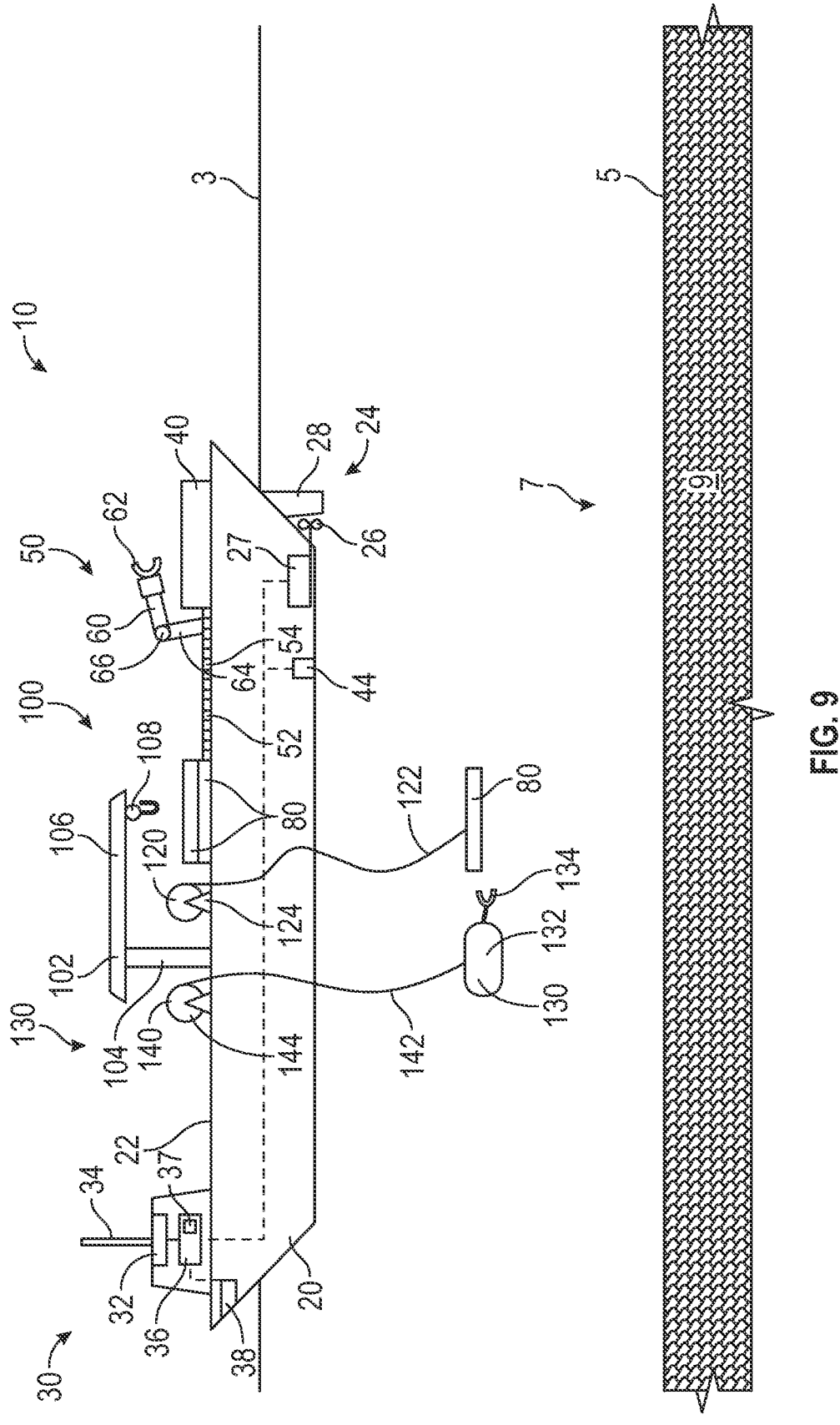
FIG. 9 is a schematic view of the uncrewed node deployment system of FIGS. 1-9 deploying nodes according to a second node deployment method according to some embodiments.

As shown in FIG. 9, with node deployment container 80 and ROV 132 each in the water, container 80 and ROV 132 may simultaneously and in parallel be lowered towards the seabed 5. Node deployment container 80 may then be positioned on the seabed 5, at which point ROV 132 may quickly begin deploying sensor nodes 42 from the node deployment container 80 to the desired subsea location 7. In some embodiments, a model of tether 122 and/or umbilical 142 may be stored in the memory device 37 of the controller 36 of control system 30. The models of tether 122 and umbilical 142 may predict the physical behavior of tether 122 and umbilical 142 subsea as node deployment container 80 and ROV 132 are lowered towards the seabed 5. The predicted behavior may allow node deployment container 80 and ROV 132 to be lowered in parallel without entangling the tether 122 coupled to container 80 with the umbilical 142 coupled to ROV 132. For instance, the models of tether 122 and/or umbilical 142 may be incorporated into a control schema for operating ROV 132, winch 124 and/or winch 144.

In some embodiments, system 10 may comprise a fleet of surface vessels 20 acting in concert. Utilizing a fleet of relatively small surface vessels 20 to deploy sensor nodes 42 or other subsea devices rather than a single, relatively large crewed vessel may allow surface vessels 20 to operate in environments in which larger crewed vessels are prohibited from operating. For example, a fleet of relatively small surface vessels 20 may operate in proximity to large infrastructure (e.g., offshore production platforms or other offshore industrial infrastructure) where it would be too dangerous for large crewed vessels to operate. Thus, along with reducing the overall cost in operating each surface vessel 20 by minimizing their size, surface vessels 20 may also provide greater flexibility in where sensor nodes 42 or other subsea devices may be deployed.

Figure 10:
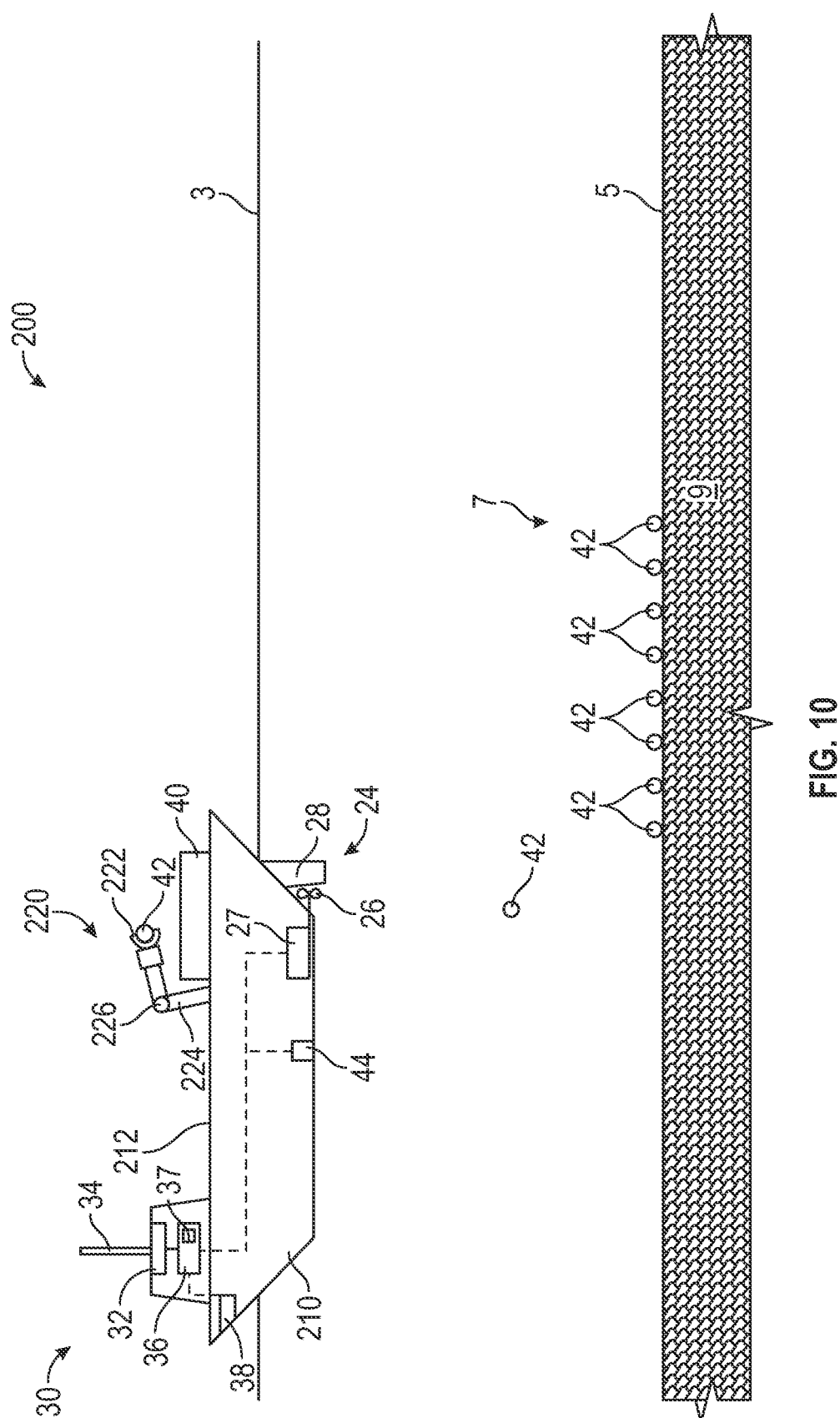
FIG. 10 is a schematic views of another uncrewed node deployment system according to some embodiments.

Referring to FIG. 10, another embodiment of an uncrewed offshore node deployment system 200 is shown. System 200 may include features in common with system 10 shown in FIGS. 1-9, and shared features are labeled similarly. In this exemplary embodiment, system 200 generally includes an uncrewed surface vessel 210, node storage container 40 containing a plurality of sensor nodes 42, and a robotic arm 220. Thus, system 200 does not include node deployment containers 80, container deployment system 100, or ROV system 130. Instead, system 200 is generally configured to deploy sensor nodes 42 freely from the waterline 3, allowing the sensor nodes to fall freely through the water towards the seabed 5.

Robotic arm 220 of system 200 is positioned on a deck 212 of surface vessel 210 and is generally configured to retrieve sensor nodes 42 from node storage container 40, position the retrieved sensor node 42 over the waterline 3, and drop the sensor node 42 into the water where it may descend towards the seabed at or near a desired subsea location 7. In this exemplary embodiment, robotic arm 220 comprises a gripper 222 and an articulatable arm 224 coupled to the gripper 222 and the deck 212. Alternatively, articulatable arm may comprise a suction device, hook, and/or other mechanism for manipulating sensor nodes 42. Robotic arm 220 may also be referred to herein as a node deployment system of the system 200. Gripper 222 may be actuatable between an open position configured to receive a sensor node 42 and a closed position (shown in FIG. 10) configured to secure or grab a sensor node 42 received therein. Articulatable arm 224 comprises one or more joints 226 configured to permit gripper 222 to rotate relative a plurality of distinct axes relative to the deck 212.

By dropping the sensor nodes 42 into the water rather than utilizing node deployment containers 80 positioned at the seabed 5, system 200 may substantially reduce the amount of time required to deploy a desired number of sensor nodes 42 to the desired subsea location 7. However, given that sensor nodes are permitted to fall freely through the water towards the seabed 5, this method of deploying sensor nodes 42 may not offer the same level of precision in placing sensor nodes 42 at the desired subsea location 7 compared to the procedures shown in FIGS. 1-9. Thus, the sensor nodes 42 deployed by system 200 may be more widely distributed around target locations than sensor nodes 42 deployed by system 10. In spite of this limitation, it may be advantageous to employ the relatively speedy deployment offered by system 200 in applications where precision in the positioning of sensor nodes 42 along seabed 5 is not required or where it is desirable to scatter sensor nodes 42 across a large area of seabed 5.

Figure 11:
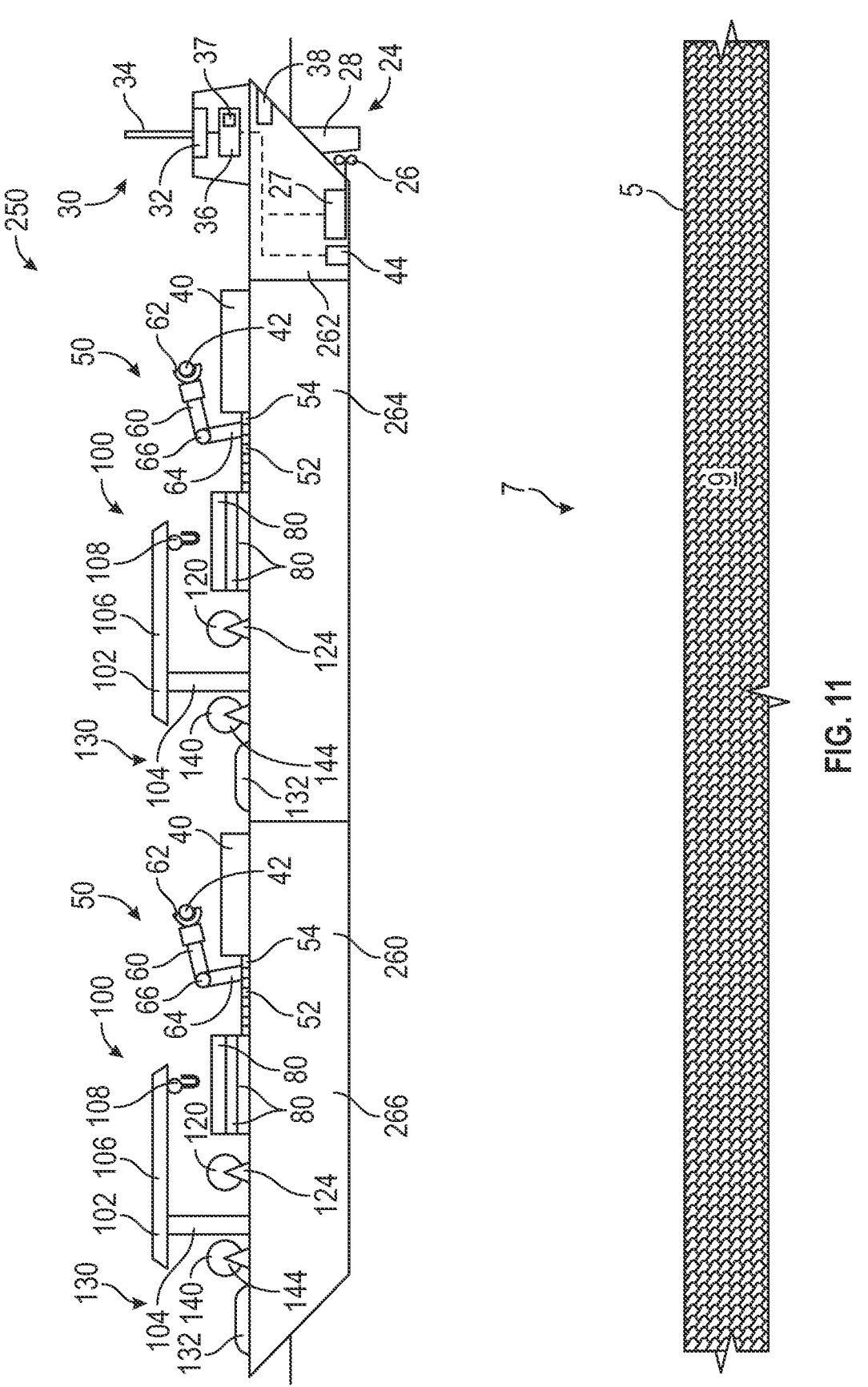
FIG. 11 is a schematic view of another uncrewed node deployment system according to some embodiments.

Referring to FIG. 11, an embodiment of an uncrewed offshore node deployment system 250 is shown. System 200 may include features in common with system 10 shown in FIGS. 1-9 and system 200 shown in FIG. 10, and shared features are labeled similarly. In this exemplary embodiment, system 250 generally includes a modular uncrewed surface vessel 260. Particularly, surface vessel 260 comprises a first or propulsion module 262 comprising propulsion system 24 and control system 30, a first node deployment module 264, and a second node deployment module 266. Each node deployment module 264, 266 is configured to separately and independently deploy one or more sensor nodes 42 to the seabed 5. In this exemplary embodiment, each node deployment module 264, 266 generally includes a node storage container 40 storing a plurality of sensor nodes 42, a node transportation system 50, a plurality of node deployment containers 80, a container deployment system 100, and a ROV system 130.

Although in FIG. 11 surface vessel 260 is shown as including two node deployment modules 264, 266, in other embodiments, surface vessel 260 may include a single node deployment module or more than two node deployment modules, depending on the needs of the given application. Particularly, each module 262, 264, and 266 of surface vessel 260 may comprise an independent surface vessel which are coupled together to form surface vessel 260. Thus, surface vessel 260 may be modular and the configuration of surface vessel 260 may be conveniently altered, adding or subtracting node deployment modules, etc., to tailor the configuration of surface vessel 260 to the application at hand. Particularly, the size of surface vessel 260 may be minimized as much as possible by reducing the number of node deployment modules to match the need of the particular application.

Figure 12:
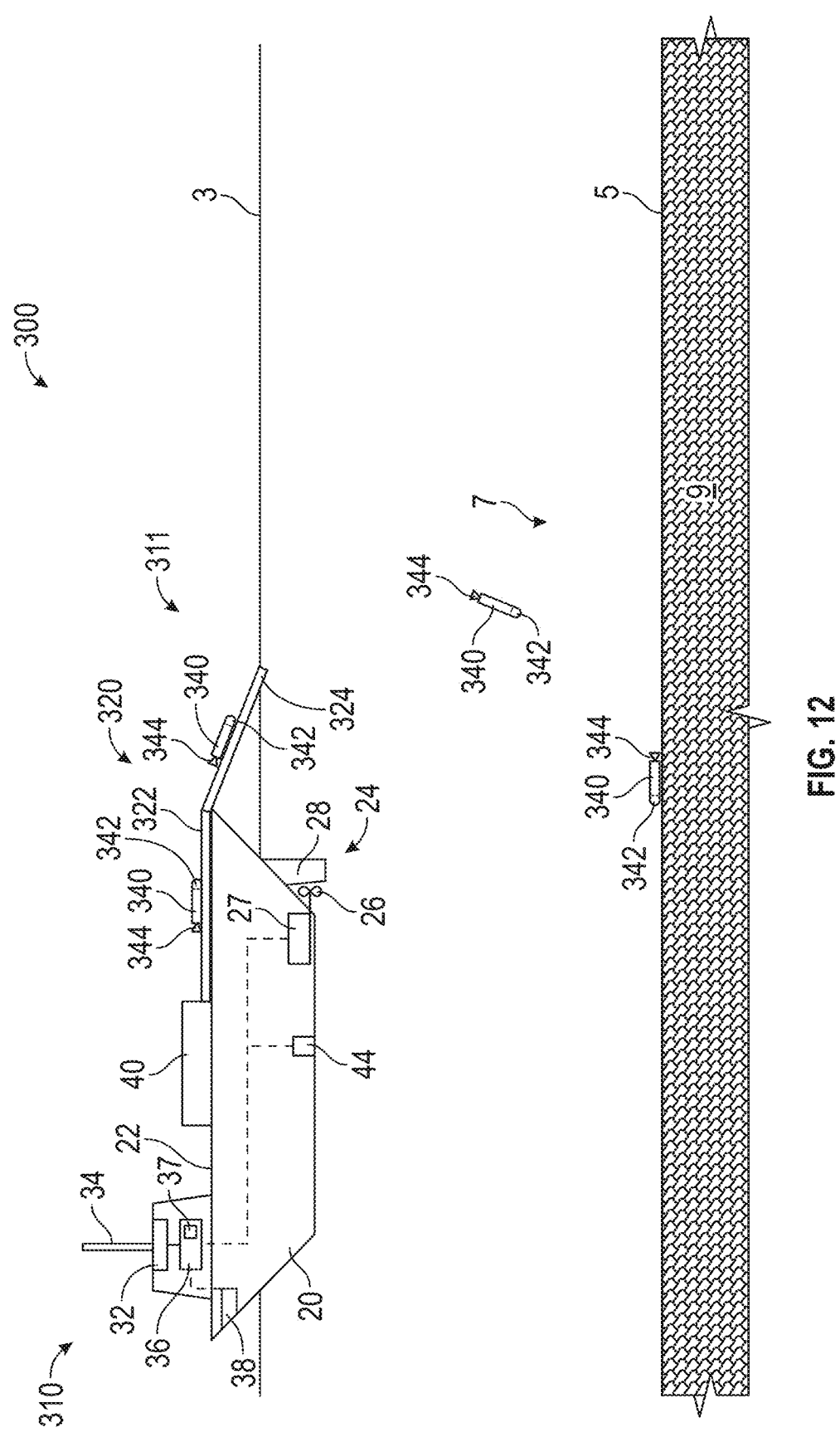
FIG. 12 is a schematic view of another uncrewed node deployment system according to some embodiments.

Referring to FIG. 12, another embodiment of an uncrewed offshore node deployment system 300 is shown. System 300 may include features in common with system 10 shown in FIGS. 1-9, and shared features are labeled similarly. In this exemplary embodiment, system 300 generally includes an uncrewed surface vessel 310, node storage container 40 containing a plurality of autonomous sensor nodes 340, and a node transporter or conveyor 320. Unlike the sensor nodes 42 described above, autonomous sensor nodes 340 are configured to guide themselves towards a desired subsea location 7 located near or at the seabed 5.

Particularly, in this exemplary embodiment, each autonomous sensor node 340 includes a guidance system 342 and a propulsion system 344. Guidance system 342 may comprise one or more sensors and potentially a wireless communications interface or module. The one or more sensors of guidance system 342 provide data pertaining to the current position and/or trajectory of the autonomous sensor node 340 and may include one or more optical sensors or cameras, thermal sensors, and/or others. The propulsion system 344 of autonomous sensor node 340 transports the autonomous sensor node 340 to the desired subsea location 7 based on feedback provided by the guidance system 342. The propulsion system 344 may comprise a propeller, a water jet, or other mechanism for generating the thrust required for transporting the autonomous sensor node 340. The thrust generated by propulsion system 344 may be vectored to control the trajectory of autonomous sensor node 340 and/or the node 340 may include one or more adjustable control surfaces. The propulsion system 344 may also include one or more ballast tanks which may be adjusted by the autonomous sensor node 340 to control the ballast of the node 340. For example, the guidance system 342 of autonomous sensor node 340 may reduce the ballast of node 340 when the node 340 returns to the waterline 3 following a subsea deployment. It may be understood that the configuration of autonomous sensor node 340, including the configuration of guidance system 342 and/or propulsion system 344, may vary from that shown in FIG. 12.

The conveyor 320 of system 300 is supported by and positioned on the deck 22 of surface vessel 310 and is generally configured to transport the autonomous sensor nodes 340 from the node storage container 40 to an exit position 311 spaced from the node storage container 40 and from which the node 340 may be delivered into the water where the autonomous sensor node 340 may, under its own power and guidance, travel towards the desired subsea location 7. In this exemplary embodiment, conveyor 320 generally includes a conveyor belt 322 which is driven along a continuous path by a powertrain of the conveyor 320. The conveyor belt 322 may comprise various different arrangements, from elastomeric belts to metallic chains and other flexible members which may be displaced continuously about an enclosed, continuous track.

The conveyor 320 extends from a first end proximal the node storage container 40 to an opposing second end proximal the exit position 311. The first end of the conveyor 320 may extend into the node storage container 40 which may be at least partially filled with water. In this example, autonomous sensor nodes 340 may swim or otherwise travel onto the conveyor 320 whereby the conveyor 320 may transport the autonomous sensor node 340 to the exit position 311. Alternatively, system 300 may include a robotic arm or other device supported on the surface vessel 310 and configured to transport the autonomous sensor nodes 340 from the node storage container 40 to the conveyor 320 for transportation to the exit position 311.

In this exemplary embodiment, conveyor 320 includes an inclined ramp 324 which projects from an outer periphery of the deck 22 of surface vessel 310 and into the water. In this configuration, autonomous sensor nodes 340 may be transported along the ramp 324 of conveyor 320 and delivered directly into the water before travelling autonomously towards the desired subsea location 7. However, in other exemplary embodiments, conveyor 320 may not include a ramp 324 and instead may terminate at the periphery of the deck 22 of surface vessel 310 where the autonomous sensor nodes 340 may be dropped from the deck and into the water from where the nodes 340 may travel autonomously towards the desired subsea location 7.

It may be understood that after having been deployed to the desired subsea location 7, the autonomous sensor nodes 340 may be recovered to the node storage container 40 on the surface vessel 310 in a manner similar to, but reversed from, the process of deploying autonomous sensor nodes 340 into the water described above. For example, at the desired subsea location 7, an autonomous sensor node 340 may autonomously activate its propulsion system 344 to increase ballast and thereby cause the node 340 to float vertically upwards towards the waterline 3. The autonomous sensor node 340 may autonomously swim towards the exit position 311 at which point the node 340 may be picked up by the ramp 324 of conveyor 320 and returned by the conveyor 320 to the node storage container 40.

Referring to FIG. 13, a method 350 for deploying a plurality of nodes offshore is shown. Method 350 begins initially at block 352 where an uncrewed surface vessel (e.g., surface vessels 20, 210, and 260 shown in FIGS. 1-11) are transported to an offshore location, wherein a node storage container (e.g., node storage container 40 show in FIGS. 1-12) is supported by a deck of the surface vessel, the node storage container comprising a plurality of nodes (e.g., sensor nodes 42 shown in FIGS. 1, 6, 7, 8, 10, and 11 and/or the node sensors 340 shown in FIG. 12). In some embodiments, the nodes are stored in the node storage container such that the nodes are physically disconnected from each other. In some embodiments, block 352 comprises remotely piloting the surface vessel via a control system of the surface vessel from a remote location.

At block 354 of method 350, the nodes are retrieved from the node storage container using a node deployment system supported by the deck of the surface vessel or housed by the node storage container itself. In some embodiments, block 354 comprises retrieving the nodes individually from the node storage container using a robotic arm (e.g., robotic arm 60 shown in FIGS. 1-9) supported by the deck of the surface vessel, and transporting the nodes retrieved from the node storage container using a conveyor (e.g., conveyor 52 shown in FIGS. 1-9 or the conveyor 320 shown in FIG. 12) whereby the nodes are deposited into a node deployment container (e.g., node deployment containers 80 shown in FIGS. 1-11). At block 356 of method 350, the nodes are deployed to a subsea location using the node deployment system. In some embodiments, block 356 comprises lifting the node deployment container from the deck of the surface vessel using a lifting crane (e.g., lifting crane 102 shown in FIGS. 1-9) and lowering the node deployment container towards a seabed using a tether (e.g., tether 122 shown in FIGS. 4, 9). Alternatively, the nodes may be deployed into the water separately from the node storage container. For instance, the nodes may be conveyed from a node storage container to an exit position spaced from the node storage container from which the node sensor may enter the water (e.g., by being dropped or conveyed to the waterline). Block 356 may also comprise retrieving the nodes individually from the node deployment container using a ROV (e.g., ROV 132 shown in FIGS. 1-9).

While exemplary embodiments have been shown and described, modifications thereof can be made by one skilled in the art without departing from the scope or teachings herein. The embodiments described herein are exemplary only and are not limiting. Many variations and modifications of the systems, apparatus, and processes described herein are possible and are within the scope of the invention. For example, the relative dimensions of various parts, the materials from which the various parts are made, and other parameters can be varied. Accordingly, the scope of protection is not limited to the embodiments described herein, but is only limited by the claims that follow, the scope of which shall include all equivalents of the subject matter of the claims. Unless expressly stated otherwise, the steps in a method claim may be performed in any order. The recitation of identifiers such as (a), (b), (c) or (1), (2), (3) before steps in a method claim are not intended to and do not specify a particular order to the steps, but rather are used to simplify subsequent reference to such steps.

What is claimed is:

1. An offshore node deployment system, comprising:
a control system;
a surface vessel comprising a deck, and a propulsion system in signal communication with the control system;
a node storage container supported by the deck of the surface vessel, wherein the node storage container is configured to store a plurality of nodes which are physically disconnected from each other at least partially within an interior of the node storage container; and
a node deployment system supported by the deck of the surface vessel and controllable by the control system, wherein the node deployment system is configured to retrieve the nodes from the interior of the node storage container, transport the nodes external the interior of the node storage container, and deploy the nodes from the surface vessel to a target subsea location;
wherein the control system comprises one or more processors and one or more memory devices containing instructions that, when executed by the one or more processors, cause the one or more processors to:
autonomously operate the propulsion system to transport the surface vessel to a target offshore location at which the plurality of nodes are to be deployed based on directions contained in an operational plan stored in the one or more memory devices;
autonomously direct the node deployment system to retrieve the nodes from the from the interior of the node container, transport the nodes external the interior of the node storage container, and deploy the nodes from the surface vessel to the target subsea location based on the directions contained in the operational plan.

2. The system of claim 1, wherein the surface vessel comprises a seismic source configured to emit an acoustic signal and the nodes comprise sensor nodes each configured to receive the acoustic signal.

3. The system of claim 1, wherein the control system comprises a controller configured to control the node deployment system and a wireless communication system configured to receive signals from a remote pilot of the surface vessel for controlling the propulsion system and the node deployment system.

4. The system of claim 1, wherein the node deployment system comprises:
a node transportation system supported by the deck of the surface vessel and configured to deposit the nodes received from the node storage container into a submersible node deployment container;
a container deployment system supported by the deck of the surface vessel and configured to transport the node deployment container from the deck of the surface vessel to the target subsea location; and a remotely operated underwater vehicle (ROV) supported by the deck of the surface vessel and configured to retrieve the nodes from the node deployment container.

5. The system of claim 4, wherein the node transportation system comprises a robotic arm configured to retrieve the nodes from the node storage container and a conveyor configured to transport the nodes retrieved by the robotic arm.

6. The system of claim 5, wherein the container deployment system comprises a lifting crane configured to lift the node deployment container from the deck of the surface vessel.

7. The system of claim 1, wherein the node deployment system is configured to retrieve an individual node from the node storage container and deploy the individual node to the target subsea location.

8. The system of claim 1, wherein at least a portion of the control system is not positioned on the surface vessel.

9. The system of claim 1, wherein the node storage container comprises a node transporter configured to transport at least one of the plurality of nodes from a storage position within the node storage container to an exit position.

10. The system of claim 9, wherein the exit position is located at a position beyond an outer periphery of the deck of the surface vessel.

11. The system of claim 9, wherein the node transporter comprises a conveyor having a ramp extendable below a waterline.

12. An offshore node deployment system, comprising:
a control system;
a surface vessel comprising a deck, and a propulsion system in signal communication with the control system;
a node storage container supported by the deck of the surface vessel, wherein the node storage container is configured to store a plurality of nodes at least partially within an interior of the node storage container; and
a node deployment system supported by the deck of the surface vessel and controllable by the control system, wherein the node deployment system is configured to retrieve an individual node from the interior of the node storage container, transport the node external the interior of the node storage container, and deploy the node from the surface vessel to a target subsea location;
wherein the control system comprises one or more processors and one or more memory devices containing instructions that, when executed by the one or more processors, cause the one or more processors to:
autonomously operate the propulsion system to transport the surface vessel to a target offshore location at which the node is to be deployed based on directions contained in an operational plan stored in the one or more memory devices;
autonomously direct the node deployment system to retrieve node from the interior of the node storage container, transport the node external the interior of the node storage container, and deploy the node from the surface vessel to the target subsea location based on the directions contained in the operational plan.

13. The system of claim 12, wherein the surface vessel comprises a seismic source configured to emit an acoustic signal and the plurality of nodes comprise sensor nodes each configured to receive the acoustic signal.

14. The system of claim 12, wherein the surface vessel comprises a modular surface vessel comprising a plurality of separable and releasably coupled modules including a propulsion module comprising the propulsion system, and a first node deployment module comprising the node deployment system.

15. The system of claim 14, wherein the surface vessel comprises a second node deployment module comprising another node deployment system.

16. The system of claim 12, wherein the node deployment system comprises:
a node transportation system supported by the deck of the surface vessel and configured to deposit the node received from the node storage container into a submersible node deployment container;
a container deployment system supported by the deck of the surface vessel and configured to transport the node deployment container from the deck of the surface vessel to the target subsea location; and
a remotely operated underwater vehicle (ROV) system supported by the deck of the surface vessel and configured to retrieve the node from the node deployment container.

17. The system of claim 16, wherein the node transportation system comprises a robotic arm configured to retrieve the node from the node storage container and a conveyor configured to transport the node retrieved by the robotic arm.

18. The system of claim 17, wherein the container deployment system comprises a lifting crane configured to lift the node deployment container from the deck of the surface vessel.

19. The system of claim 12, wherein the node storage container is configured to store the plurality of nodes such that the plurality of nodes are free to move independently relative each other.

20. The system of claim 12, wherein at least a portion of the control system is not positioned on the surface vessel.

21. The system of claim 12, wherein the node storage container comprises a node transporter configured to transport the node from a storage position within the node storage container to an exit position.

22. The system of claim 21, wherein the exit position is located at a position beyond an outer periphery of the deck of the surface vessel.

23. The system of claim 21, wherein the node transporter comprises a conveyor having a ramp extendable below a waterline.

24. A method for deploying a plurality of nodes offshore, comprising:
(a) autonomously transporting by a control system a surface vessel to a target offshore location at which the plurality of nodes are to be deployed based on directions container in an operational plan stored in one or more memory devices of the control system, wherein a node storage container is supported by a deck of the surface vessel, the node storage container comprises the plurality of nodes which are physically disconnected from each other and at least partially received within an interior of the node storage container;
(b) autonomously retrieving by the computer system and, based on the directions contained the operational plan, the nodes from the interior of the node storage container and transporting the nodes external the interior of the node storage container using a node deployment system supported by the deck of the surface vessel; and
(c) autonomously deploying by the computer system and, based on the directions contained in the operational plan, the nodes from the surface vessel to a target subsea location using the node deployment system.

25. The method of claim 24, wherein (a) comprises remotely piloting the surface vessel via a control system of the surface vessel from a remote location.

26. The method of claim 24, wherein (b) comprises retrieving the nodes individually from the node storage container and (c) comprises deploying the nodes individually to the target subsea location.

27. The method of claim 26 wherein:

(b) comprises:

(b1) retrieving the nodes individually from the node storage container using a robotic arm supported by the deck of the surface vessel; and (b2) transporting the nodes retrieved from the node storage container using a conveyor whereby the nodes are deposited into a node deployment container;

(c) comprises:

(c1) lifting the node deployment container from the deck of the surface vessel using a lifting crane and lowering the node deployment container towards a seabed using a tether; and (c2) retrieving the nodes individually from the node deployment container using a remotely operated underwater vehicle (ROV).

28. The method of claim 24, wherein (c) comprises transporting the nodes from the node storage container to an exit position that is spaced from the node storage container.

\* \* \* \* \*